US012749384B2

(12) United States Patent
Curiel

(10) Patent No.: US 12,749,384 B2
(45) Date of Patent: Sep. 29, 2026

(54) SECURITY SYSTEMS AND METHODS FOR DETECTING HAZARDS USING SMART SENSORS

(71) Applicant: State Farm Mutual Automobile Insurance Company, Bloomington, IL (US)

(72) Inventor: Jennifer Curiel, Anna, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 175 days.

(21) Appl. No.: 18/736,034

(22) Filed: Jun. 6, 2024

(65) Prior Publication Data

US 2025/0252833 A1 Aug. 7, 2025

Related U.S. Application Data

(60) Provisional application No. 63/549,234, filed on Feb. 2, 2024.

(51) Int. Cl.
*G08B 13/24* (2006.01)
*B60L 53/60* (2019.01)

(52) U.S. Cl.
CPC .............. *G08B 13/24* (2013.01); *B60L 53/60* (2019.02)

(58) Field of Classification Search
CPC ........ B60L 53/60; G08B 13/24; G08B 29/186
See application file for complete search history.

(56) References Cited

U.S. PATENT DOCUMENTS

| | | | |
|---|---|---|---|
| 8,433,344 | B1 | 4/2013 | Virga |
| 8,712,805 | B1 | 4/2014 | Ferries et al. |
| 10,055,793 | B1 | 8/2018 | Call et al. |
| 10,062,118 | B1 | 8/2018 | Bernstein et al. |
| 10,229,394 | B1 | 3/2019 | Davis et al. |
| 10,623,509 | B2 | 4/2020 | Delinselle et al. |
| 10,672,081 | B1 | 6/2020 | Lyons et al. |
| 10,699,346 | B1 | 6/2020 | Corder et al. |

(Continued)

FOREIGN PATENT DOCUMENTS

| | | | |
|---|---|---|---|
| AU | 2015100551 | A4 | 5/2015 |
| WO | 2018052595 | A1 | 3/2018 |

OTHER PUBLICATIONS

Dryad Connecting the Natural World, available at <https://www.dryad.net/>, 5 pages.

(Continued)

*Primary Examiner* — Sisay Yacob
(74) *Attorney, Agent, or Firm* — Armstrong Teasdale LLP

(57) ABSTRACT

A sensor for detecting hazards is described that includes a memory and a processor. The processor may be configured to generate sensor profile data associated with a location and apply the sensor profile data to a sensor model profile associated with the location wherein the sensor model profile includes a plurality of parameter levels for the location generated by a machine learning model. The processor may also be configured to identify a discrepancy between the sensor profile data and the sensor model profile and determine a potential hazard at the location based upon the discrepancy between the sensor profile data and the sensor model profile. The processor may further be configured to generate an alert based upon the potential hazard at the location.

18 Claims, 7 Drawing Sheets

(56) References Cited

U.S. PATENT DOCUMENTS

| | | | |
|---|---|---|---|
| 10,861,115 B1 | 12/2020 | Stricker et al. | |
| 11,003,334 B1 | 5/2021 | Conway et al. | |
| 11,037,255 B1 | 6/2021 | Ganev et al. | |
| 11,055,797 B1 | 7/2021 | Carone | |
| 11,087,347 B1 | 8/2021 | De Guia et al. | |
| 11,087,420 B1 | 8/2021 | Trundle | |
| 11,210,741 B1 | 12/2021 | Allen et al. | |
| 11,501,100 B1 | 11/2022 | Geng et al. | |
| 11,656,097 B2 | 5/2023 | Vega et al. | |
| 11,715,074 B2 | 8/2023 | Aspro et al. | |
| 11,748,817 B2 | 9/2023 | Szott | |
| 11,875,664 B2 | 1/2024 | White | |
| 2008/0255862 A1 | 10/2008 | Bailey et al. | |
| 2011/0270773 A1 | 11/2011 | Siekman et al. | |
| 2011/0295624 A1 | 12/2011 | Chapin et al. | |
| 2012/0072239 A1 | 3/2012 | Gibbard et al. | |
| 2014/0358592 A1 | 12/2014 | Wedig et al. | |
| 2015/0061859 A1 | 3/2015 | Matsuoka et al. | |
| 2016/0048934 A1 | 2/2016 | Gross | |
| 2016/0055594 A1 | 2/2016 | Emison et al. | |
| 2016/0189526 A1 | 6/2016 | Kennedy et al. | |
| 2016/0225240 A1 | 8/2016 | Voddhi et al. | |
| 2016/0275633 A1 | 9/2016 | Gitt et al. | |
| 2016/0300479 A1 | 10/2016 | Modi et al. | |
| 2016/0321587 A1 | 11/2016 | Gitt et al. | |
| 2018/0033087 A1 | 2/2018 | Delinselle et al. | |
| 2019/0251520 A1 | 8/2019 | Bentley, III et al. | |
| 2021/0011448 A1 | 1/2021 | Coleman et al. | |
| 2021/0018335 A1 | 1/2021 | Hood | |
| 2021/0019847 A1 | 1/2021 | Sneed | |
| 2021/0150651 A1 | 5/2021 | Shoup | |
| 2021/0182986 A1 | 6/2021 | Butler et al. | |
| 2021/0279791 A1 | 9/2021 | Jacoby | |
| 2021/0350471 A1 | 11/2021 | Hakimi-Boushehri et al. | |
| 2022/0343443 A1 | 10/2022 | Graham et al. | |
| 2022/0391794 A1 | 12/2022 | Singh et al. | |
| 2023/0035517 A1 | 2/2023 | Bentley, III et al. | |
| 2024/0311925 A1* | 9/2024 | Snyder | G06Q 40/08 |
| 2025/0027789 A1* | 1/2025 | Zahid | G06N 20/00 |
| 2025/0029488 A1* | 1/2025 | Zahid | G06N 20/00 |

OTHER PUBLICATIONS

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

* cited by examiner

SECURITY SYSTEMS AND METHODS FOR DETECTING HAZARDS USING SMART SENSORS

CROSS-REFERENCE TO RELATED APPLICATIONS

This application claims the benefit of priority to U.S. Provisional Patent Application No. 63/549,234, filed Feb. 2, 2024, and entitled "SECURITY SYSTEMS AND METHODS FOR DETECTING HAZARDS USING SMART SENSORS," the contents and disclosures of which are hereby incorporated by reference herein in their entirety.

FIELD OF THE DISCLOSURE

The field of the disclosure relates generally to detecting hazards using smart sensors, and more specifically, to systems and methods that include smart sensors that utilize artificial intelligence and/or machine learning tools to detect hazards at various locations such as within or near buildings or at outdoor locations.

BACKGROUND

Sensors that detect hazards are becoming more and more prevalent in today's society. These sensors may be specific to a particular hazard. For instance, known sensors may include water sensors to detect water leaks, fire sensors to detect fires, and carbon monoxide (CO) sensors to detect unsafe levels of CO. Notably, various problems may arise when different sensors are utilized to detect different hazards. Examples may include increased costs (e.g., paying for each individual sensor), upkeep, and difficulty finding locations for each specific sensor. Known sensors may also be slow in detecting hazards (e.g., allowing significant amounts of damage to occur before a hazard is identified by a sensor). Conventional techniques may include additional inefficiencies, encumbrances, ineffectiveness, and/or other drawbacks as well.

BRIEF DESCRIPTION

The present embodiments may relate to, inter alia, improved computer-based security systems and computer-implemented methods for detecting hazards using all-in-one monitoring smart sensors. The computer systems and computer-implemented methods may generate and analyze data relating to an environment and/or condition of a building and/or outdoor location. The computer systems and methods described herein may include smart sensors for detecting certain data points and artificial intelligence and/or machine learning tools to detect hazards from the gathered data points at various locations such as within or near buildings or at outdoor locations.

In one aspect, a computer system may query an AI model (e.g., a large language trained generative AI model) to initiate, for example, an alert in response to detection of a hazard (e.g., fire, gas, mold, asbestos, CO, etc.). The use of the AI model may be available in various mediums such, as a computer and/or mobile application, chat screens, web page, voice interaction with a voice chat-capable connected home device, voice bot or chat bot, and/or social media messaging. The systems and methods described herein may include additional, less, or alternate functionality, including that discussed elsewhere herein.

In another aspect, a sensor for detecting hazards may be provided. The sensor may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and other electronic or electrical components, which may be in wired or wireless communication with one another. For example, in one instance, the sensor may include at least one memory with instructions stored thereon and at least one processor in communication with the at least one memory. The instructions, when executed by the at least one processor, cause the at least one processor to (i) generate sensor profile data associated with a location proximate to the sensor based upon sensor data generated by (e.g., and/or collected by) the sensor, and/or (ii) apply the sensor profile data to a sensor model profile associated with the location and stored in the at least one memory. The sensor model profile may include a plurality of parameter levels for the location proximate to the sensor generated by a machine learning model. The instructions may also cause the at least one processor to (iii) identify a discrepancy between the sensor profile data and the sensor model profile, and/or (iv) determine a potential hazard at the location based upon the discrepancy (and/or comparison) between the sensor profile data and the sensor model profile. The instructions further may cause the at least one processor to (v) generate an alert based upon the potential hazard at the location. The sensor may include additional, less, or alternate functionality, including that discussed elsewhere herein.

In another aspect, a computer system for detecting hazards and/or analyzing sensor data may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another. For example, in one instance, the computer system may include one or more processors and one or more non-transitory memories storing processor-executable instructions that, when executed by the one or more processors, cause the system to (i) generate sensor profile data associated with a location of a sensor based upon sensor data generated by (e.g., and/or collected by) the sensor, and/or (ii) apply the sensor profile data to a sensor model profile associated with the location and stored in the at least one memory. The sensor model profile may include a plurality of parameter levels for the location proximate to the sensor generated by a machine learning model. The instructions may also cause the at least one processor to (iii) identify a discrepancy between the sensor profile data and the sensor model profile, and/or (iv) determine a potential hazard at the location based upon the discrepancy between the sensor profile data and the sensor model profile. The instructions further may cause the at least one processor to (v) generate an alert based upon the potential hazard at the location. The computer system may include additional, less, or alternate functionality, including that discussed elsewhere herein.

In another aspect, at least one non-transitory computer-readable storage medium with instructions stored thereon may be provided. The instructions, when executed by at least one processor, may cause the at least one processor to (i)

generate sensor profile data associated with a location of a sensor based upon sensor data generated by (e.g., and/or collected by) the sensor, and/or (ii) apply the sensor profile data to a sensor model profile associated with the location and stored in the at least one non-transitory computer-readable storage medium. The sensor model profile may include a plurality of parameter levels for the location proximate to the sensor generated by a machine learning model. The instructions may also cause the at least one processor to (iii) identify a discrepancy between the sensor profile data and the sensor model profile, and/or (iv) determine a potential hazard at the location based upon the discrepancy (and/or other analysis or comparison) between the sensor profile data and the sensor model profile. The instructions further may cause the at least one processor to (v) generate an alert based upon the potential hazard at the location. The at least one non-transitory computer-readable storage medium may include additional, less, or alternate functionality, including that discussed elsewhere herein.

In another aspect, a computer-implemented method for detecting hazards and/or analyzing sensor data may be provided. The method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another. For example, in one instance, the computer-implemented may be implemented via processor-executable instructions that, when executed by the one or more processors, cause a computer system and/or at least one processor in communication with at least one memory. The computer-implemented method may include (i) generating sensor profile data associated with a location of a sensor based upon sensor data generated by (e.g., and/or collected by) the sensor, and/or (ii) applying the sensor profile data to a sensor model profile associated with the location and stored in the at least one memory. The sensor model profile may include a plurality of parameter levels for the location proximate to the sensor generated by a machine learning model. The computer-implemented method may also include (iii) identifying a discrepancy between the sensor profile data and the sensor model profile, and/or (iv) determining a potential hazard at the location based upon the discrepancy (and/or other analysis or comparisons) between the sensor profile data and the sensor model profile. The computer-implemented method may also include (v) generating an alert based upon the potential hazard at the location. The computer-implemented method may include additional, less, or alternate functionality, including that discussed elsewhere herein.

As noted, in some aspects, a computer system for detecting hazards and/or detecting sensor data may be provided. The computer system may include one or more local or remote processors, servers, sensors, transceivers, mobile devices, wearables, smart watches, smart contact lenses, voice bots, chat bots, ChatGPT bots, augmented reality glasses, virtual reality headsets, mixed or extended reality headsets or glasses, and/or other electronic or electrical components, including those mentioned elsewhere herein, which may be in wired or wireless communication with one another.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed. However, it should be understood that the present embodiments are not limited to the precise arrangements and/or instrumentalities shown.

Figure 1:
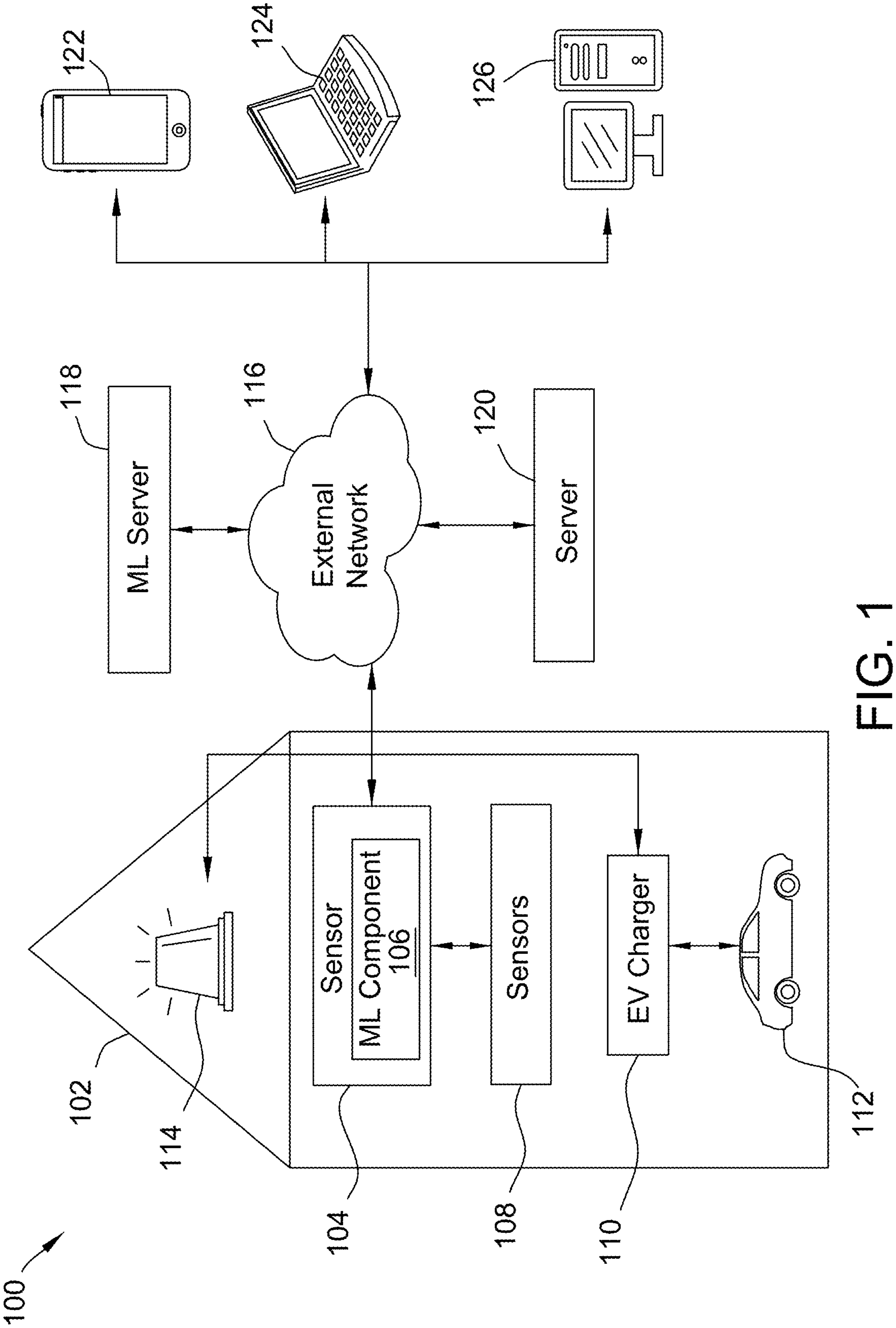
FIG. 1 illustrates an exemplary sensor system for detecting hazards in accordance with at least one exemplary embodiment of the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may be associated with, inter alia, smart sensors that may provide an all-in-one solution to detect hazards (e.g., fire, CO, gas, mold, asbestos, battery degradation, electric vehicle (EV) issues (such as EV battery degradation, failure, corrosion, leaks, structural integrity issues, component failure, exhaust, fire, smoke, odors, etc.)). For instance, the smart sensors described herein may monitor various factors such as temperature, humidity, air pressure, air odors or smell, and/or air quality.

The smart sensors may collect parameters and/or values for each of these factors. For example, an exemplary sensor may collect or detect a temperature value, a humidity value, an air pressure value, and/or an air quality value for a particular location where the sensor is located. The smart sensor may also collect an air sample and analyze the air sample to determine other compounds and/or elements that exist in the air sample. The collected and/or detected parameters for each factor may be used to create a sample fingerprint and/or profile for that particular location.

A machine learning (ML) algorithm integrated into the smart sensor may continually train the smart sensor to the specific sample profile for the location where the sensor is located. The learning and/or training provided by the ML algorithm may allow the smart sensor to create a sample profile over time, which may allow the smart sensor to determine a baseline profile along with any naturally occurring changes in the baseline profile over time. For example, a sensor may determine a baseline sample profile for a location but then may also detect normally occurring changes in the profile, such as from a vehicle periodically driving by the location and giving off some exhaust, a fire that may be nearby, and/or some other exhaust that may alter the baseline sample profile but not necessarily change it in such a way to generate an alert and/or alarm.

Additionally or alternatively, the smart sensor may be able to detect changes, such as minor changes or over in a home, garage, or other environment (such as in smell and/or air quality) that may not be noticeable to most humans, such as by comparing current odors, smells, and/or air quality to baseline and/or pre-existing profile built over time, or even a default profile. For instance, EV batteries may degrade over time, which may cause a slight odor or change in smell or air quality in a garage storing an EV, and/or charging an EV battery. For instance, the chemical reaction(s) during EV battery charging may create unusual odors, air quality, changes in detectable particles in the air, or even fires that the smart sensor may detect and then provide an alert to home occupants.

In certain embodiments, a smart sensor may use a default profile as a starting point and update that profile over time to create a profile specific to the location of the smart sensor (e.g., certain locations may be more or less humid than others at baseline, etc.). The profile specific to the location of the smart sensor may continue to be updated over time and/or upon a location change of the smart sensor.

In some embodiments, historic data and/or data from other sensors in a similar location to the smart sensor may be utilized in building the profile specific to the location of the smart sensor. Detected deviations from the profile specific to the location of the smart sensor (e.g., differences that meet a predetermined and/or threshold amount of difference, identified substances that cause an automatic response, etc.) may then cause the smart sensor to generate alerts, as described herein.

For instance, in some embodiments, the smart sensor (e.g., as part of a system) may collect an air sample and detect certain compounds that are indicators of the start of a fire and/or other hazard. It should be appreciated that profiles associated with non-hazardous, normal conditions for different locations and/or different smart sensors may vary widely.

Artificial intelligence (AI) technology (e.g., the ML algorithm) may be applied to the sensor to detect hazards related to various dangerous elements that would be monitored through a single device (e.g., the smart sensor) for users. While multiple sensors may be utilized, monitoring may be all inclusive to one sensor (e.g., application of the ML algorithm to data provided by a sensor device in communication with other sensors).

In some embodiments, the smart sensor may include, additionally and/or alternatively to other components described herein, a housing, one or more solar panels configured to power the smart sensor, and/or a sensor array (e.g., including any of the sensors described herein). For instance, the housing may be made from one or more hazard-proof materials so that the smart sensor may withstand a hazard and continue to, for example, cause alerts to be provided and/or detect other hazards as a hazard is occurring. In other words, the housing may allow the smart sensor to withstand a detected hazard (e.g., and/or other wear and tear) and continue to provide alerts during a hazard without malfunctioning. As one example, the housing may be fireproof so that during a fire, the smart sensor may still operate and provide alerts (e.g., to a user device, emergency responders, etc.). As another example, the housing may be waterproof so that sensor may continue to operate properly during flooding.

The smart sensor may use AI techniques to determine a baseline profile (e.g., normal conditions) for a location and then, based upon the baseline profile, determine parameter levels and/or thresholds for generating alerts and/or setting off alarms. For instance, the smart sensor described herein may be used in a home, other building (e.g., hospital, laboratory), and/or outdoors (e.g., the smart sensor may be brought on a camping trip) to detect gas, battery fires from electric vehicle (EV) chargers and/or batteries, mold, asbestos and/or other hazardous materials. The smart sensor may also detect pressure changes, temperature changes, and/or other parameters. In some cases, the smart sensor may be housed within a vehicle such as an EV to detect battery fires at an early stage during or related to charging such as before the fire is ignited so as to prevent such fires.

Once levels and/or thresholds for alerts are set (e.g., based upon the baseline profile), the smart sensor may continuously "smell" (e.g., collect air samples) and compare the measured parameters to the threshold levels to see if any of the multiple compounds that it is detecting meets those levels and/or thresholds. If so, an alert may be sent.

The smart sensor may also be configured to determine a severity of the hazard. For example, if the detected hazard is an electrical fire in a home setting or a gas leak, the smart sensor may set that at a high level of severity for the hazard, and thus, send an alert that might include a loud sounding alarm to prompt people to get out of the home along with a 911 call to the fire department. In contrast, a low-level severity hazard may include a water leak in a basement which may result in a text message and/or phone call being placed to the homeowner.

For example, the smart sensor may generate and transmit and/or produce an alert. An alert may be an audible alarm and/or visual alarm produced by the smart sensor and/or another device. Another example of an alert may be an alert that is transmitted (e.g., by the smart sensor and/or another device) to a user device (e.g., a mobile phone). Smart alerts may also be utilized that include instructions for addressing and/or removing a hazard. Different alerts may be provided for different hazards. For instance, the alert response to a fire may include an audible alert (e.g., loud), a visual alert, and/or a message transmitted in real-time to a user device because of the severity of the hazard. Alerts for more minor hazards, for example, may include an alert sent to a user device (e.g., for hazards that do not require immediate attention).

In some embodiments, the smart sensor may automatically cause one or more actions to be performed to address a hazard. For instance, if the smart sensor detects an electrical fire, the sensor may automatically cause a circuit breaker associated with a location of the electrical fire to trip. As another example, the smart sensor may automatically cause sprinklers associated with the location of the fire to activate, spraying water to address the fire.

In some embodiments, the smart sensor may include and/or be in communication with an energy tracking device that generates energy data, such as a home electric meter, individual electricity monitoring (EM) devices (e.g., TING® smart sensors such as those made commercially available by Whisker Labs of Germantown, MD), and/or smart devices capable of measuring their own energy usage. For example, the energy data may include overall energy usage of the home (e.g., in kilowatt hours) and energy usage of individual systems, appliances, devices, and/or categories thereof in a home.

Further, the energy data may include data received from utility companies and/or self-reported data from the homeowner. In addition to energy usage, the energy data may include other related data such as, for example, sizes, locations, types and/or models of electric devices and/or appliances in the home, settings of electric devices and/or appliances (e.g., thermostat settings, temperature settings of refrigerators, EV batteries and electric vehicles generally), frequency of certain energy consuming activities (e.g., use of dishwashers and/or laundry machines), information about maintenance that is performed and/or frequency of maintenance (e.g., replacing air filters and/or cleaning), details about the home that may affect energy efficiency (e.g., types of roofing, building materials, and/or insulation used, presence of trees and/or shading devices). In some embodiments, a mobile application and/or web page may be provided (e.g., with a fillable form and/or questionnaire) that enables a homeowner to input the energy data. The received energy data may be stored as being associated with a user profile associated with the homeowner.

In some embodiments, the energy data may be enhanced using an AI model. For example, the smart sensor may use the AI model to identify one or more devices and/or systems present in the home, for example, based upon profiles of energy usage over time to correspond to known profiles of certain types of systems or devices. For example, an HVAC system has a certain energy usage profile with increases in energy usage when the HVAC system is active (e.g., during periods in which it is hot). Therefore, energy usage matching the profile may be attributed to the HVAC system. Accordingly, the smart sensor may determine an energy usage associated with each of the one or more devices, which in turn may be used by the system as energy data.

In some embodiments, abnormal electricity flow ("EF") to various devices may indicate that failure is imminent, maintenance and/or device replacement is needed, de-energization is recommended, and/or other corrective actions are prudent. EF data collected by the smart sensor (e.g., via an EM device) may include data indicative of electricity flow to or from various smart or other Internet of things (IoT) devices and/or non-connected devices. EF data may also include electricity and/or energy usage for each electronic component, device, outlet, circuit, or the like, within the home, such as data indicating the electricity each device and/or room is using. For example, energy usage of air conditioners, washers, dryers, dish washers, refrigerators, stoves, ovens, microwave ovens, televisions, lamps, outlets, computers, laptops, mobile devices, and/or other electronic devices may be determined by the smart sensor.

EF data may be used by the smart sensor to detect hazards and/or other abnormalities that may be correlated with a reduced energy efficiency of the powered appliances and/or indicate a risk to the home or its assets. For example, changes in electrical consumption (e.g., drawing more power and/or current than usual) of IoT devices and/or non-connected devices may indicate that IoT devices and/or non-connected devices are having problems that may influence an energy efficiency of IoT devices and/or non-connected devices. Accordingly, EF data collected by the smart sensor may be fed into the AI model at the smart sensor as a factor in determining energy efficiency, generating recommendations to improve the energy efficiency, and/or detecting hazards.

EM devices may include sensors that are configured to monitor and collect EF data. EM devices may be plugged into electrical outlets within the home (e.g., conventional 110-volt outlets) for at least powering the EM device, IoT devices, and/or non-connected devices, and/or may be electrically wired into a circuit for powering the EM device, IoT devices, and/or non-connected devices. Further, some EM devices may collect EF data directly from a circuit (e.g., via wired connection to the circuit, referred to herein as "direct sensing") and some EM devices may wirelessly collect EF data from circuits, appliances, and/or other electricity consuming devices (referred to herein as "wireless sensing"). Wireless sensing may include, for example, sensors within the EM device that are configured to sense electromagnetic waves and/or an electrical signature of the electrical devices receiving power from the electrical distribution system.

The EM device may directly and/or wirelessly detect each flow of electricity to or from each different electronic device by identifying each electronic device by its unique electronic or electrical signature (or "fingerprint"). The EM device may then generate electricity usage and/or flow data for each electronic device within the home, or connected to the electrical distribution system (such as a hybrid or fully electric vehicle having its battery directly or wirelessly charged by the home's electrical system). In some embodiments, EM devices may be positioned in vicinity of an electrical distribution panel and may capture electrical activity about the home and/or devices installed in the home by wirelessly detecting an electricity flow to devices that are coupled to the electrical distribution panel.

In some embodiments, EM devices may be positioned in vicinity of the electrical distribution panel, but not hardwired to the electrical distribution panel or home electrical wiring system, and may capture electrical activity about the home and/or appliances installed in the home by wirelessly detecting an electricity flow to devices that are coupled to the electrical distribution panel. In some embodiments, EM devices may be plugged into electrical outlets positioned throughout a home.

During operation, as one or more of the electric devices receives electricity via an electrical distribution system, each device may be differentiated by an electrical signature that is unique to a respective device (such as by one or more EM devices monitoring, detecting, and/or analyzing the electricity flowing to or being consumed by each respective electric device, and/or by monitoring EF data generated or collected by one or more EM devices).

In other words, transmission of electricity to a refrigerator, for example, may be differentiated from transmission of electricity to an electric stove (such as via one or more EM devices and/or analyzing the EF data generated or collected by one or more EM devices). Further, transmission of electricity to a television on one circuit or outlet, for example, may be differentiated from transmission of electricity to another recipient electric device (e.g., a cable television box) via the same circuit or electrical outlet.

The smart sensor may correlate electrical activity with a variety of electric devices on the electrical distribution system based upon electrical signatures unique to each respective device. The smart sensor may build a structural electrical profile for the home, which may include data indicative of operation of the various electric devices within or around the home (e.g., over a period of time), such as by using EF data generated or collected by one or more EM devices over a period of time. In some embodiments, the electrical profile may further be used in identifying specific models of appliances to be added to the digital home profile.

In some embodiments, an EM device may be affixed to or situated near an electrical distribution panel. Generally, the EM device may utilize the unique, differentiable electrical signatures of the electric devices by directly or wirelessly monitoring electrical activity including transmission of electricity via the electrical distribution panel to one or more of the electric devices. Monitoring of transmission of electricity to an electric device receiving the electricity may include, for example, monitoring (i) the time at which the electricity was transmitted, (ii) the duration for which the electricity was transmitted, and/or (iii) the magnitude of the electric current in the transmission.

Based upon the unique electrical signatures of the various electric devices of the home, the monitored electrical activity may be correlated with respective electric devices receiving the electricity transmitted via the electrical distribution system, enabling the electricity usage of the various devices to be tracked individually. Further, electrical activity associated with other components of the electrical distribution system (e.g., the electrical distribution panel, the circuits, or the like) may be correlated with one or more electric devices to which the electrical activity also pertains.

In some embodiments, the smart sensor may perform the correlation or other functions described herein, via one or more processors of the smart sensor that may execute instructions stored at one or more computer memories of the smart sensor. Additionally or alternatively, the smart sensor may collect the EF data, and/or other data described herein and may receive data or signals indicative of monitored electricity or other data via one or more processors or through transfer via a physical medium (e.g., a USB drive). Correlation of the electrical activity with the respective electrical devices may produce data indicating, for example, the time, duration, and/or magnitude of electricity consumption by each of the electric devices during a period of electrical activity monitoring.

Based upon at least the correlated electrical activity, a structure electrical profile may be built and/or stored at the smart sensor or at some other system (e.g., a server). The structure electrical profile may include, for each of the electric devices about the home, data indicative of operation of the respective electric device during at least the period at which the EM devices monitored electrical activity about the home. Based upon the correlated electrical activity, the structure electrical profile may depict, for example, average electricity operation/usage, baseline electricity operation/usage, and/or expected electricity operation/usage/consumption. In effect, the structure electrical profile, based upon electrical activity about the structure, may set forth what is "normal" operation and usage of electricity about the structure.

Thus, once the structure electrical profile is built, any electrical activity monitored via smart sensor may be analyzed to determine whether electrical activity is abnormal and/or otherwise indicative of a condition that my affect the energy efficiency of the electric devices. In response to the abnormal electrical activity, among other possible factors, occurring or potentially occurring hazards, imminent or potentially imminent hazards, corrective actions to improve the energy efficiency of the device, mitigate damage, prevent damage, and/or remedy the cause of the abnormal electrical activity the situation may be determined and/or initiated by the smart sensor.

Further, the structure electrical profile may include a digital "map" of the home or location. A home map may indicate spatial locations of the electric devices, and/or spatial relationships between two or more of the electric devices. The map may indicate, for example, a risk associated with the spatial placement of a stove, and/or a risk associated with placing a refrigerator adjacent to the stove. Additionally or alternatively, the home map may indicate which of the electric devices are connected to each electrical circuit within the electrical distribution system of the home. The map may indicate, for example, a risk of overloading a particular circuit based upon a number of or intensity of electric devices connected to the circuit. As another example, the home map may be used to determine what electric devices may lose power if a particular circuit were to be de-energized (e.g., due to risk or abnormal electrical activity associated with the circuit and/or an electric device connected thereto).

In some embodiments, the home map may be configurable by a user (e.g., the homeowner of the home). The user may, for example, configure the map via an I/O module or an input device (e.g., screen, keypad, mouse, voice control, etc.) of a user device, or via an I/O module of another computing device, which may transmit the home map to the user device. Additionally or alternatively, the home map may be stored at one or more computer memories of another device (e.g., a server computing device). The home map may be displayable on a user device such that the user is able to see a map of energy consumption over time within the home including how much energy is consumed by the different devices within the home over time and/or if any anomalies in energy consumption have occurred during that period of time (and if so), where those anomalies have occurred.

EF data regarding an electric device may include, for example, historical data indicating the electric device's past operation patterns or trends. For example, historical data may indicate a time of day, day of the week, time of the month, etc., at which an electric device frequently uses electricity (e.g., a lighting fixture may not use electricity during late night hours of the day). As another example, historical data may include the electric device's total electricity consumption or usage rate over a period of time. Additionally or alternatively, historical data may include data indicating past events regarding the electric device (e.g., breakdowns, power losses, arc faults, etc.).

Additionally or alternatively, operation data regarding an electric device may include an expected electricity consumption or baseline electricity consumption for the electric device. For example, in the case of a refrigerator, the refrigerator's electricity consumption during a first period of monitoring may be reliably used to approximate an expected electricity consumption at a later time. Changing electricity consumption over time (e.g., the refrigerator's consumption is greater than expected for a period) may indicate that the refrigerator is in need of repair and/or maintenance and/or operating sub-optimally.

As another example, electric vehicle (EV) charging of an EV may be monitored during a first period of monitoring to approximate an expected electricity consumption at a later time. The smart sensor, as described herein, may detect and/or receive data from an EV sensor and/or the EV itself regarding the charging of the EV. The smart sensor may then identify whether or not a hazard is occurring or potentially occurring (e.g., based upon a comparison with a stored profile associated with normal, non-hazardous charging of an EV, such as charging during the first period). The identification by the smart sensor of a hazard or no hazard may be based upon data gathered by the smart sensor in combination with data gathered by the EV sensors and/or the EM device. The combination of data allows the smart sensor to more readily predict when an electrical fire is about ready to begin due to an EV charging, and thus, is able to prevent further and more severe damage as a result of such fire.

Further, the structure electrical profile may include data pertaining to the structure as a whole. For example, the structure electrical profile may include data reflecting a total electricity or average usage rate over a period of time. As another example, the profile may include time-of-day, day-of-week, etc., data reflecting times at which the home as a whole uses more or less electricity. Further, the profile may detail specific types, classes, or specifications of electric devices that behave differently or consume a different amount of electricity compared to other electric devices within the home. Further, the profile may detail specific risks determined to be relevant to one or more of the electric devices or to the home as a whole, based upon the electrical activity of the electric devices.

In other words, a sensor for detecting hazards is described. The sensor may generate sensor profile data associated with a location proximate to the sensor based upon sensor data generated by the sensor and apply the sensor profile data to a sensor model profile associated with the location and stored in memory wherein the sensor model profile includes a plurality of parameter levels for the location proximate to the sensor generated by a machine learning model. The sensor may identify a discrepancy between the sensor profile data and the sensor model profile, determine a potential hazard at the location based upon the discrepancy between the sensor profile data and the sensor model profile, and generate an alert based upon the potential hazard at the location.

In some embodiments, the sensor is in communication with a plurality of sensors associated with the location, the plurality of sensors being different from the sensor, and the sensor may receive additional sensor data from the plurality of sensors and generate the sensor profile data further based upon the additional sensor data. Further, the plurality of sensors may include an electric vehicle (EV) sensor for monitoring charging of an EV wherein the potential hazard is associated with a potential electrical hazard associated with the charging of the EV (e.g., the smart sensor may gather and/or receive data associated with EV charging, as described herein, and determine that an EV and/or EV charger fire is occurring or about to occur).

In some embodiments, the sensor may receive an input indicating that normal conditions are present at the location, generate initial sensor profile data based upon the location, input the initial sensor profile data to the machine learning model, receive the sensor model profile as an output from the machine learning model, and store the sensor model profile in memory as being associated with the location.

In some embodiments, the sensor may receive another input indicating that the sensor has been moved to a different location, generate updated sensor profile data associated with the different location based upon updated sensor data generated by the sensor at the different location, input the updated sensor profile data to the machine learning model, receive an updated sensor model profile as an output from the machine learning model wherein the updated sensor model profile includes a plurality of updated parameter levels for the different location, and store the updated sensor model profile in memory as being associated with the different location.

Further, the sensor may generate new updated sensor profile data associated with the different location proximate to the sensor based upon new updated sensor data generated by the sensor, apply the new updated sensor profile data to the updated sensor model profile, identify a discrepancy between the new updated sensor profile data and the updated sensor model profile, determine a potential hazard at the different location based upon the discrepancy between the new updated sensor profile data and the updated sensor model profile, and generate a second alert based upon the potential hazard at the different location.

In some embodiments, the sensor may determine a severity level of the potential hazard at the location and determine the alert from a plurality of alert options based upon the severity level wherein the plurality of alert options include an audible alert outputted by the sensor and an alert message transmitted by the sensor to a computer device associated with the location.

At least one of the technical problems addressed by this system may include: (i) time-consuming, labor-intensive, and costly implementation and/or use of a plurality of isolated sensors to identify hazards; (ii) inefficient analysis of sensor data to identify hazards; (iii) false positive determinations that a hazard will occur and/or is occurring; (iv) inability to detect a variety of hazards within a location; and/or (v) inability to utilize AI and machine learning techniques to build a profile of a surrounding area that represents commonly occurring smells, contaminants, odors, smoke, and/or other particulate in that area in addition to more randomly occurring smells, contaminants, odors, smoke, and/or other particulate in that area.

The technical benefits and/or effects achieved by this system may be at least one of: (i) an all-in-one solution to remove the time-consuming, labor-intensive, and costly implementation and/or use of a plurality of isolated sensors to identify hazards; (ii) efficient analysis of sensor data to identify hazards (e.g., via AI techniques and/or a ML model); (iii) avoiding false positive determinations that a hazard will occur and/or is occurring (e.g., by building profiles specific to different locations); (iv) ability to detect a variety of hazards within a location; and/or (v) ability to utilize AI and machine learning techniques to build a profile of a surrounding area that represents commonly occurring smells, contaminants, odors, smoke, and/or other particulate in that area in addition to more randomly occurring smells, contaminants, odors, smoke, and/or other particulate in that area.

A technical effect of the systems and processes described herein may be achieved by performing at least one of the following steps: (i) generating sensor profile data associated with a location of a sensor based upon sensor data generated by the sensor; (ii) applying the sensor profile data to a sensor model profile associated with the location and stored in at least one memory wherein the sensor model profile includes a plurality of parameter levels for the location proximate to the sensor generated by a machine learning model; (iii) identifying a discrepancy between the sensor profile data and the sensor model profile; (iv) determining a potential hazard at the location based upon the discrepancy between the sensor profile data and the sensor model profile; and/or (v) generating an alert based upon the potential hazard at the location.

Exemplary System for Detecting Hazards

FIG. 1 illustrates an exemplary computer system 100 for detecting hazards in accordance with the present disclosure. System 100 may be implemented in a building 102, such as a home. System 100 illustrates a smart sensor 104 including a machine learning (ML) component 106, one or more additional sensors 108, an electric vehicle (EV) charger 110, an EV 112, an alarm 114 (e.g., audio and/or visual), an external network 116, an ML server 118, a server 120 (e.g., an insurance provider server), and user devices 122-126 (e.g., computing devices such as a smartphone, tablet, laptop, and/or other computing device). In an exemplary embodiment, smart sensor 104 is communicatively coupled to servers 118, 120 and/or user devices 122-126 via external network 116.

In some embodiments, smart sensor 104 may include a plurality of sensors such as one or more of heat sensors, WiFi sensors, motion sensors, video sensors, air sensors, etc., that provide real-time data about the current environmental conditions of building 102. Additional sensors 108 may be located at various locations of building 102 and may include one or more of heat sensors, WiFi sensors, motion sensors, video sensors, air sensors, etc.

Additional sensors 108, in the exemplary embodiment, may include a home security system. The home security system may include security devices such as, for example, door or window sensors (e.g., to detect when doors and/or windows are open, when windows are broken), motion sensors (e.g., to detect when someone is present within range of the sensor), security cameras (e.g., for capturing audio/video of particular areas in and/or around the location, such as a doorbell camera), key pads (e.g., for enabling and/or disabling the security system), panic buttons (e.g., for alerting a security service and/or authorities of an emergency situation), security hubs (e.g., for integrating individual security devices into a security system, for centrally controlling such devices, for interacting with third parties), electric door locks, and/or smoke/fire/carbon monoxide detectors. "Security devices" may broadly represent devices that can detect potential risks to the location or its occupants (e.g., intrusion, fire, health).

The home security system may be configured to communicate with a third-party security service and/or local authorities. Smart sensor 104 may transmit alerts to a third-party security service and/or local authorities when security-related events are detected. Smart sensor 104 may be configured to receive alert data from a home security system and may transmit alerts to server 120, create historical logs of security events, and/or transmit alert events directly to the homeowner (e.g., via SMS text message or the like) and/or to local authorities, fire protection, and/or emergency services. Smart sensor 104 may use ML component 106 to analyze security alert events to, for example, determine how frequently security events are identified (e.g., as a factor for risk), how often identified security events are true security events (e.g., legitimate risks rather than false alarms), and/or the type and/or nature of legitimate risks and/or false alarms.

Smart sensor 104 may use raw data collected directly from any security devices. For example, smart sensor 104 may use raw data from the motion sensors to detect when the location is occupied (e.g., to build a profile of occupancy times), may use raw data from the camera devices and/or door devices to detect when occupants enter and/or exit the location, may use the camera devices to determine a number of occupants of the location and/or a number and/or type of pets in the location. Smart sensor 104 may determine information about the home security system installed within the location, such as a number and/or type of security sensors installed within the location, a type of home security system installed in the location (e.g., third-party service provider, device manufacturers, types of security protection implemented within the location), and/or how often the homeowners leave the location unoccupied without activating the home security system (e.g., as a factor in risk calculations and/or home health scoring). Smart sensor 104 may rate the home security system, associated devices, and/or associated services to generate a home security protection rating (e.g., relative to other available security systems and/or hardware) and may use the home security protection rating as a factor in risk calculations and/or in preparing a risk mitigation proposal (e.g., for more devices, improved devices, and/or improved security systems). In some embodiments, the home security protection rating may be calculated using ML component 106.

In some embodiments, additional sensors 108 may include, for example, water leak detectors and/or flood alarms that may be configured to detect the presence of water at various areas in the location, such as near HVAC equipment, water tanks, sump pumps, below showers and/or bath tubs, around basement perimeters, behind and/or within basement walls, or the like. Water detectors may identify leaks within plumbing and/or appliances within the location and/or ingress of water into the location (e.g., rain water, flooding, failing sump pump, foundation cracks, or the like).

Smart sensor 104 may collect alarm data from additional sensors 108 and may perform automatic alerting based upon sensor events registered at additional sensors 108 (e.g., alerting emergency services, the homeowner, or the like, in an effort to protect life, property, and/or mitigate damage) and/or initiate automatic actions (e.g., shutting off water flow within the location and/or within a particular segment of plumbing, via activating a smart water shut off valve, as an example). Smart sensor 104 may identify the presence of additional sensors 108 and/or shut off valves in the location when configured to communicate with additional sensors 108. Smart sensor 104 may automatically provide policy discounts when additional sensors 108 are detected as present. Smart sensor 104 may analyze the presence and/or absence of additional sensors 108 in the various aspects of home health scoring, as described herein.

In some embodiments, smart sensor 104 may include and/or be in communication with an energy tracking device that generates energy data, such as a home electric meter, individual electricity monitoring (EM) devices (e.g., a TING® smart sensor), and/or smart devices capable of measuring their own energy usage. For example, the energy data may include overall energy usage of the home (e.g., in kilowatt hours) and energy usage of individual systems, appliances, devices, and/or categories thereof in a home.

In the exemplary embodiment, ML server 118 may build a model configured to output an energy score and/or predictions relating to energy usage and/or costs for building 102. The output may further include recommendations for steps that can be taken to improve the energy score and/or reduce energy costs associated with building 102. In cases where there are multiple recommended actions, the output may further include a recommended order in which to perform the recommended actions, for example, to most time-efficiently and/or cost-effectively improve the energy score (e.g., over time). For example, recommended maintenance actions may be prioritized based upon the practical and/or financial ease of carrying out the recommendations (e.g., whether they involve hiring professional services and/or ordering new products), the expected benefits of these actions, and/or other such factors. The output generated by the model may further include recommendations for where to purchase and/or obtain products and/or services associated with the recommended actions. In some embodiments, recommendations from the model may include links (e.g., hyperlinks) for purchasing recommended products (e.g., appliances) and/or hiring recommended professional services. In some embodiments, the model may be trained based upon product and/or service reviews (e.g., online reviews) such that products and/or services with better reviews are more likely to be recommended by the model.

In the exemplary embodiment, the model may compute an energy score for building 102 based upon the retrieved energy data. The energy score may be expressed and/or displayed as a number (e.g., a zero to one hundred score), a category (e.g., excellent, good, fair, etc.), a color (e.g., green for more efficient versus red for less efficient), a grade (e.g., A-F scale), and/or another type of indictor. The energy score may be generally indicative of how energy efficient building 102 is compared to similar homes and/or a theoretical ideal home that is similarly situated. In some embodiments, the energy score may periodically be updated, for example, in response to the homeowner inputting and/or a server (e.g., ML server 118) retrieving new energy data and/or the model itself being updated based upon new training data.

Figure 2:
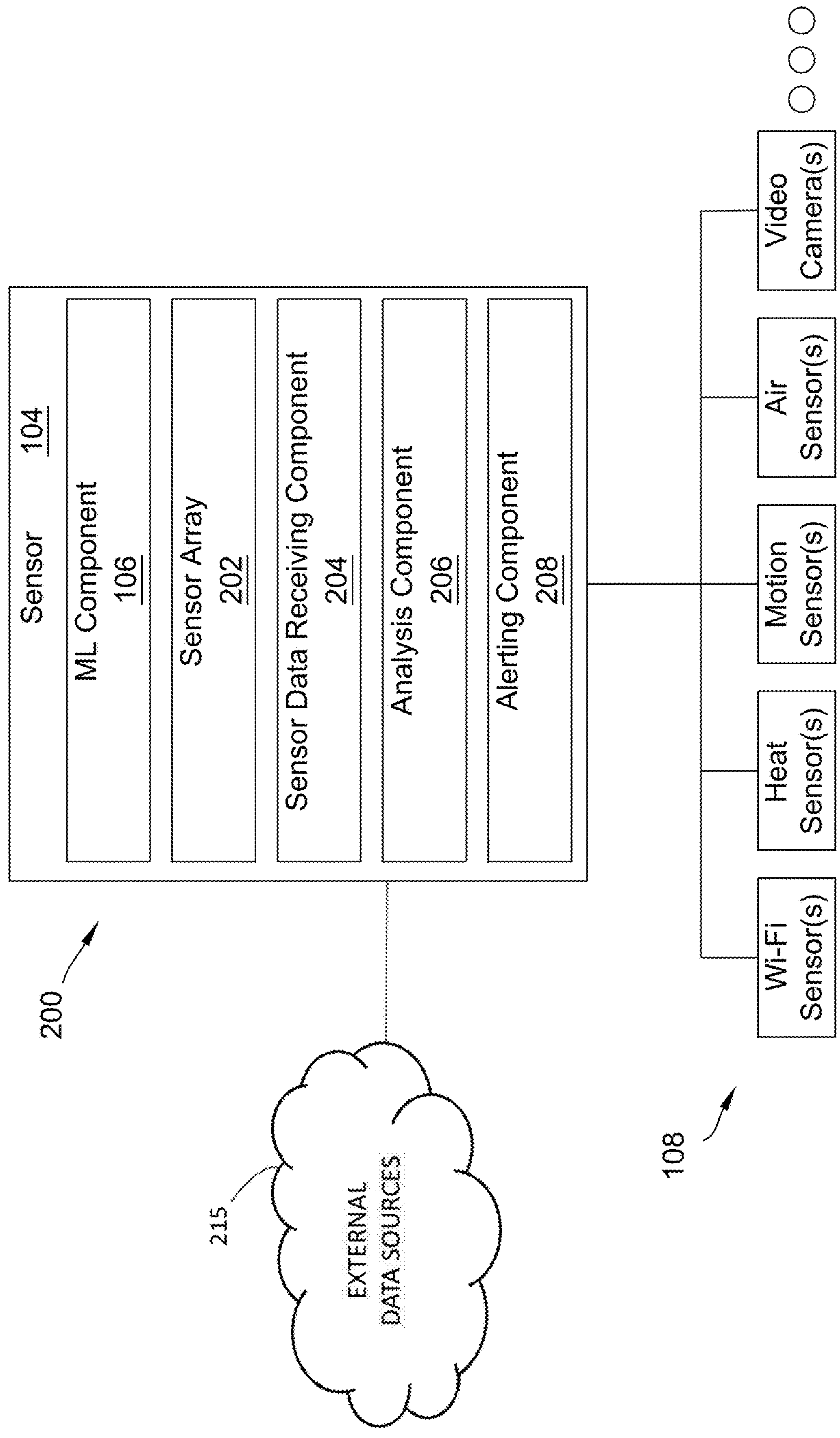
FIG. 2 illustrates a block diagram of part of the exemplary sensor system shown in FIG. 1 in accordance with at least one exemplary embodiment of the present disclosure.

In some embodiments, smart sensor 104 may include at least one electronic nose (e-nose) sensor. The e-nose sensor may include a multi-sensor array that is monitored by pattern-recognition algorithms (e.g., as defined by ML component 106). More specifically, the e-nose sensor may include a cross-reactive sensor array composed of different sensors (e.g., sensory array 202, as shown in FIG. 2) selectively chosen to respond to a wide range of chemical classes and discriminate diverse mixtures of possible analytes. The output from each of the sensors may be collectively assembled and integrated to produce a distinct digital response pattern. Identification and classification of an analyte mixture by the e-nose sensor may be accomplished through recognition of the distinct digital response pattern (e.g., electronic fingerprint) of the array of sensors. The distinct digital response pattern may be compared to a reference library of distinct digital response patterns (e.g., as defined by ML component 106) for known samples to determine the types of chemical compounds in the sample. The recognition and/or determination of the types of chemical compounds may be optimized using utilize artificial intelligence and/or machine learning techniques, such as artificial neural networks (ANNs), ML component 106, and/or ML server 118. For instance, ML component 106 may receive training data from ML server 118 and use the training data to update one or more profiles (e.g., associated with non-hazardous and/or potentially hazardous situations) stored at smart sensor 104.

In some embodiments, the e-nose sensor may filter the air to detect whether certain compounds are present in the air near or at building 102. The sensor data from the e-nose sensor may be applied to an AI model generated by ML component 106 (e.g., and based upon a profile of "normal," potentially non-hazardous conditions generated by smart sensor 104) to determine whether a hazard is occurring or is imminent.

In some embodiments, the e-nose sensor may include an electronic sensing device intended to detect odors and/or emissions. The expression "electronic sensing" refers to the capability of reproducing human senses using sensor arrays and pattern recognition systems. The stages of the recognition process are similar to human olfaction and are performed for identification, comparison, quantification, and/or other applications.

The e-nose sensor may include head space sampling, a chemical sensor array, and/or pattern recognition modules, to generate signal patterns that are used for characterizing odors. The e-nose sensors may include three major parts: a sample delivery system, a detection system, and/or a computing system. The sample delivery system enables the generation of the headspace (volatile compounds) of a sample, which may be the fraction analyzed. The system may then inject the headspace into the detection system of the electronic nose. The sample delivery system is used to facilitate constant operating conditions. The detection system, which may include a sensor set, is the "reactive" part of the instrument. When in contact with volatile compounds, the sensors react, which means they experience a change of electrical properties.

In some sensors, each sensor is sensitive to all volatile molecules but each in their specific way. Some of the sensors use chemical sensor arrays that react to volatile compounds on contact: the adsorption of volatile compounds on the sensor surface causes a physical change of the sensor. A specific response is recorded by the electronic interface transforming the signal into a digital value. Recorded data are then computed based upon models.

Some e-nose sensors include: metal-oxide-semiconductor (MOS) devices—metal-oxide-semiconductor sensors contain a metal oxide coating with an electrical resistance that changes in the presence of a target gas—the presence of the target gas can be inferred by measuring the change in the resistance of the metal oxide layer over time; conducting polymers—organic polymers that conduct electricity; polymer composites—similar in use to conducting polymers but formulated of non-conducting polymers with the addition of conducting material such as carbon black; quartz crystal microbalance (QCM)—a way of measuring mass per unit area by measuring the change in frequency of a quartz crystal resonator; surface acoustic wave (SAW)—a class of microelectromechanical systems (MEMS) which rely on the modulation of surface acoustic waves to sense a physical phenomenon; and/or mass spectrometers that can be miniaturized to form general purpose gas analysis device. In some embodiments, the measurements may be stored in a database and/or used for future reference. In some cases, other types of electronic noses may be used that utilize mass spectrometry and/or ultra-fast gas chromatography as a detection system.

Using data provided by smart sensor 104 and/or sensors 108, smart sensor 104 may determine (e.g., using ML component 106) whether the data matches at least one of a plurality of profiles indicating that a hazard is occurring or about to occur.

Upon making the determination that a hazard is occurring or is about to occur, smart sensor 104 may trigger alarm 114 and/or transmit alerts via external network 116. In some embodiments, the series of alerts (e.g., types of alerts and/or timings of alerts) is customizable (e.g., by an entity associated with building 102). In some embodiments, which alerts are generated and/or transmitted are determined based upon the severity and/or potential severity of the hazard and/or potential hazard detected.

In some embodiments, a sequence of alerts may be provided by smart sensor 104. For instance, alarm 114 may be triggered and alerts may be sent to different devices (e.g., devices 122-126) associated with building 102. For instance, different individuals (e.g., at any of devices 122-126) may have the option to mark a situation as "safe" to disable an alert regarding a hazard and/or potential hazard for situations in which a false alarm is triggered. In some embodiments, the sequence of alerts is stored as part of a hazard and/or potential hazard response as determined by ML component 106 based upon the severity of the hazard and/or potential hazard.

In some embodiments, third party data relating to other buildings and/or outdoor environments within a geographic vicinity of building 102 may also be provided (e.g., via network 116) to smart sensor 104 to inform the determination of whether a hazard and/or potential hazard is occurring. In some embodiments, ML component 106 and/or smart sensor 104 may output the determination of whether a hazard and/or potential hazard is occurring in a data interchange format such as JavaScript Object Notation (JSON), which may be interpreted by other components of system 100 such as devices 122-126 to display an alert. For example, in embodiments in which the alert is displayed via a mobile application, the mobile application may be configured to generate a user interface (e.g., including text, lists, shapes, colors, sounds, etc.) for presenting alerts based upon data transmitted by smart sensor 104.

In some embodiments, smart sensor 104 is configured to retrieve building data in response to receiving a request identifying building 102 (e.g., a home) and/or an inquiry relating to building 102. Such an inquiry may be input by a user using a user device 122-126, user computer device 300, or in some cases, generated automatically in response to a detection of an issue in building 102 (e.g., by sensor 104). The building data may include data input and/or uploaded by a homeowner and/or contractors responsible for building 102 (e.g., text input, instructions, images, responses to prompts and/or questionnaires, blueprints, floor plans, CAD files, images, LIDAR scans, data generated by sensors 108 and/or smart devices, etc.), and/or other data that may be derived from this input data (e.g., using AI and/or machine learning techniques). The building data may be stored in a building database (e.g., stored in database 602), for example, in association with a building address and/or other identifier associated with building 102, homeowner, and/or persons otherwise responsible for building 102. The building data may be shared and/or accessed by others who may access or maintain building 102 (e.g., while the homeowner is away) or future owners of building 102 if building 102 is sold.

In response to receiving an inquiry from user computer device 300 (e.g., any of user devices 122-126), smart sensor 104 may identify building 102 and building data associated with a building 102 based upon the inquiry, and perform a lookup in the building database to identify information relevant for generating a response to the inquiry.

In some embodiments, the received building information may include information relating the structure of building 102, such as locations within building 102 that would be useful or dangerous to access in a given situation. For example, if an electrical issue is occurring, locations of wires, whether the wires are active, appliances relating to the issue, locations of circuit breakers and/or switches, and locations of electrical sensors may be retrieved. In another example, if a leak and/or other plumbing issue is occurring, locations of pipes, material and sizes of pipes, plumbing fixtures relating to the issue, locations of valves (e.g., manual and/or smart valves, including shut-off valves), instructions on how to access valves (e.g., physically and/or using a relevant smart valve app), locations of tools for fixing or otherwise addressing the leak, detected damage (e.g., roof or plumbing damage resulting in water and/or damage resulting from the leak, and/or damage determined from data generated or collected by water, moisture, odor or smell, and/or leak sensors or detectors), and/or locations of water flow sensors, water sensors, moisture sensors, odor sensors, and/or leak sensors and/or devices may be retrieved.

In another example, if a fire is occurring, locations of fire extinguishers and/or other fire suppression systems, fire walls, fire doors, fire alarm triggers, sprinklers and/or other water sources, information relevant to rescuing individuals (e.g., locations of individuals or hazards to rescue personnel), and/or locations of smoke detectors, water sensors, leak sensors, moisture sensors, odor sensors, and/or other relevant sensors 108 may be retrieved. In another example, if a structural issue (e.g., roof damage and/or a breach of an exterior of building 102 by an animal or falling tree) has occurred, a location of the damage and/or tools for fixing or temporarily mitigating the damage (e.g., tarps) may be retrieved.

In another example, if a technological issue occurs (e.g., computer and/or network outage or failure), locations of and/or other information and/or instructions relating to computers and/or other relevant devices (e.g., modems, routers, smart devices) may be retrieved. In another example, rather than an issue with building 102, information may be retrieved relating to routine tasks, such as instructions for cleaning, feeding pets, watering plants, cleaning, sorting and/or storing mail and/or packages, and/or other tasks. It should be appreciated that smart sensor 104 may also access any other type of data relevant to addressing these and/or other issues that may occur in a home and/or building.

In some embodiments, smart sensor 104 may receive building data from one or more user computing devices 300 (e.g., mobile phones), carried by individuals present in building 102. For example, user computer device 300 may include sensors (e.g., accelerometers, gyroscopes, global positioning system (GPS), cameras, microphones, etc.) or otherwise be configured to receive data from sensors 108 (e.g., sensors integrated into building 102). Sensors of user computer device 300 may generate data that describes, for example, the position and orientation of the user within building 102 and/or additional data relating to the status of building 102 (e.g., images). User computer device 300 may be configured to execute a mobile application ("app") that causes user computer device 300 to collect, store, and transmit the building data to smart sensor 104.

Mapping data received and/or generated by sensor 104 may include ground-level imagery provided by the web mapping service that may be used by sensor 104 to evaluate various externally visible features of home data (e.g., via digital image processing, machine learning, and/or human analysis). For example, sensor 104 may use ground-level imagery to determine structural features of the building 102 such as a number of stories of the home, type of windows installed in the home, a roof type or type of exterior of the home, and/or how many garages the home has. Sensor 104 may train a model using ground-level images of buildings 102 with labeled data of the buildings 102 indicating, for example, how many stories or garages the buildings 102 have, what type of exterior or roof type the buildings 102 have, and/or other features. As such, the trained model may be configured to automatically evaluate an unlabeled home (e.g., building 102 in FIG. 1) to determine whether such features are present and/or otherwise categorize the home with respect to those features.

In some embodiments, server 120 may be associated with a policy and/or insurance provider. Smart sensor 104 may transmit alerts and/or other data to server 120 that causes one or more policies associated with building 102 and/or EV 112 to be updated.

Exemplary Block Diagram

FIG. 2 illustrates a block diagram 200 of a portion of a computer system 100 that may be used for detecting hazards, in accordance with the present disclosure. As shown in FIG. 2, smart sensor 104 may include ML component 106, a sensor array 202 (e.g., associated with an e-nose sensor, as explained herein), sensor data receiving component (e.g., for receiving data from sensors 108, as explained herein), analysis component (e.g., for detecting hazards and/or potential hazards, as explained herein), and/or alerting component 208 (e.g., for generating and/or transmitting alerts based upon a hazard and/or potential hazard being detected, as explained herein). As shown in FIG. 2, sensors 108 may include WiFi sensors, heat sensors, motion sensors, air sensors, video cameras and/or sensors, and/or other sensors (e.g., as illustrated by the ellipsis).

In some embodiments, smart sensor 104 may include, additionally and/or alternatively to other components described herein, a housing and/or one or more solar panels configured to power smart sensor 104. For instance, the housing may be made from one or more hazard-proof materials so that smart sensor 104 may withstand a hazard and continue to, for example, cause alerts to be provided and/or detect other hazards as a hazard is occurring. In other words, the housing may allow smart sensor 104 to withstand a detected hazard (e.g., and/or other wear and tear) and continue to provide alerts during a hazard without malfunctioning. As one example, the housing may fireproof so that during a fire, smart sensor 104 may still operate properly. As another example, the housing may be waterproof so that sensor may continue to operate properly during flooding.

In some embodiments, third party data may be queried from external sources over external network 116. Some exemplary data sources include, for example, NOAA (National Oceanic and Atmospheric Administration) weather data, forest fire data (e.g. from the U.S. Forest Service), municipal power utilities, third-party home data sites (e.g. Zillow) and/or other sources for property data, geographical data such as utility providers and/or school district information, insurance provider data and/or other service provider data (e.g., for service providers that have a relationship with the owner of the smart sensor, owner of the location, aerial data, etc.)

In the exemplary embodiment, sensor 104 may collect various types of external data from external data sources 215 (e.g., via external network 116) that may be used, for example, for home health evaluation, for risk scoring, for generating home health remediation recommendations, and/or other various uses described herein. Some external data sources 215 may provide publicly available data, where other external data sources 215 may be private, third-party sources. External data sources 215 may include an insurance provider that provides insurance policies to the homeowner and various data available or otherwise collected by that insurance provider. In some embodiments, server 120 may be operated by the insurance provider and a home health database may include data private to the insurance provider (e.g., customer data, policy information, or other proprietary information).

In the exemplary embodiment, one example external data source 215 is the NOAA or any of its various branches (e.g., the national weather service). The NOAA makes various weather data publicly available. As such, sensor 104 may collect weather data from the NOAA. The weather data may be refined to a particular geography, such as a state, county, city, or other geographic region. Sensor 104 may, for example, identify a geographic region of building 102 and/or submit data queries to the NOAA for weather data specific to that geographic region. Data queries may include requests for historical data such as average rainfall, storm occurrences, wind strengths, lightning strikes, temperatures, tornado events, or the like. Historical data may be used to, for example, evaluate future risks to the building 102 over time. Data queries may include requests for forecast data such as severe watches warnings, tornado watches or warnings, flooding watches or warnings, precipitation predictions, wind predictions, lightning event predictions, blizzard warnings, or the like. Forecast data may be used to, for example, generate and/or send weather alerts to the homeowner or occupants of building 102 and/or determine how frequently building 102 experiences various warnings or alerts over time.

In the exemplary embodiment, another example external data source 215 may be the U.S. Forest Service. The U.S. Forest Service maintains historical data related to forest fires and tracks active forest fires in the United States. As such, sensor 104 may collect forest fire data from the U.S. Forest Service. Forest fire data may similarly be refined to a particular geography, such as a state, county, city, or other geographic region. Sensor 104 may, for example, collect historical forest fire data for the geographic region of building 102, and/or may collect current forest fire data at or near the location of building 102 (e.g., within a pre-defined distance from the home, within a distance from a projected path of the forest fire). Sensor 104 may use historical forest fire data to, for example, evaluate future risk of forest fires to building 102. Sensor 104 may use current forest fire data to, for example, generate and send forest fire alerts to the homeowner or occupants of building 102, or as factors in home health scoring.

In the exemplary embodiment, another example external data source 215 may be municipal power utilities. Sensor 104 may access current or historical power network data provided by power utility companies in various localities, such as power generation performance statistics (e.g., generation and load statistics), power transmission and distribution statistics or power outage information (e.g., across the network, local to a distribution segment that services building 102, consistencies of voltages, power sags, power surges, brown-outs or black-outs and associated frequencies or lengths of outages, or the like), lightning strike data affecting the power network, or electrical consumption data for building 102 (e.g., current or historical power usage, local power generation provided back to the network). Sensor 104 may use current power network data, for example, to generate and/or send alerts to the homeowner during power outages (e.g., as SMS text messages and/or emails that may be viewed on mobile computing devices), and/or as factors in home health scoring.

In the exemplary embodiment, another example external data source 215 may be third-party home data systems such as Multiple Listings Service ("MLS"), Zillow (www.zillow.com), or other Internet-accessible sources for property data. Sensor 104 may access the home data systems to collect construction details about building 102 such as, for example, the age, the number of bedrooms and/or bathrooms, the type of any HVAC, the square footage, the size of the property, the market price, whether building 102 is constructed of wood, brick, concrete, or the like, the type and/or size of any garage, the quality of materials used to construct building 102, whether building 102 has a basement, the type, age, and/or condition of plumbing or wiring inside and/or outside building 102, whether building 102 has a pool and/or safety fence around the pool, the type of roofing, the floor plan, the architecture of building 102 (e.g., ranch, two story, split foyer), the type of flooring, the type of exterior (e.g., wood, brick, siding), the type of local power generation on the property (e.g., solar, wind, generator), number of fire places, the type of fencing and/or gutters, whether building 102 has sheds, patios, porches, and/or other exterior structures, whether building 102 has outside doors having steps, type of ducting and insulation within building 102, type of landscaping around building 102, and/or mobility or accessibility options within building 102.

Some home statistics data may include geographic data about building 102 such as, for example, school district information (e.g., public school system, school ratings), utility providers available to at the location (e.g., electric, gas, sewer, waste, recycling, phone, Internet, television, fire, police, hospital, and/or other city services), proximity data to various services and/or amenities (e.g., distances from schools, parks, grocery, gas, library, and/or sources of entertainment), and/or hazard data for the area (e.g., crime statistics, natural disaster statistics, ratings for emergency services). Some home statistics data may include historical data, such as price history (e.g., sales history, listings history), public tax history, insurance claims history, home warranty information, home inspection information, lease information (e.g., whether and how often building 102 has been partially or fully rented or leased), or the like. Some home statistics data may include home energy data such as, for example, whether building 102 is energy certified, type and/or size of power generation, home appliance and/or lighting energy certification data, or the like.

In the exemplary embodiment, another example external data source 215 may be associated with an insurance provider or other service provider that has an economic or consumer relationship with the homeowner. Sensor 104 may access the service provider systems to collect demographic details about building 102 and its occupants, such as, for example, names and/or ages of the occupants, education levels and/or occupations of the occupants, whether any of the occupants smoke, a family emergency plan, community engagement of the occupants, and/or whether a business is operated out of building 102. The service provider system may collect home maintenance data about building 102 (e.g., from sensor 104) such as, for example, maintenance logs of operations performed on building 102 (e.g., service calls, property damage and fixes, routine device maintenance, cleanings, bug or pest service, lawn or garden service, roofing replacement, or the like), equipment installations and/or removals, device warranty information, and/or home improvements (e.g., new deck, pool, room(s), interior and/or exterior painting and/or weather proofing, solar installation, water reclamation systems installation, room remodeling, or the like). The service provider system may collect home configuration data about building 102 (e.g., from sensor 104) such as, for example, whether GFCI outlets or LED lights are installed in building 102, whether power strips supporting multiple devices are in use, whether building 102 has exercise equipment, types of grills and/or fryers installed in building 102, whether building 102 includes particular safety equipment (e.g., smoke and/or carbon monoxide detectors, fire extinguishers, deadbolts on exterior doors, water sensors, sump pump, or the like), and/or paint colors used on various walls of building 102.

In some embodiments, the service provider may be the operator of external network 116 and/or server 120 and the homeowner may provide data via an input interface (e.g., online questionnaire, user interface, service application, or the like, during participation in the home health system described herein). Collection and/or use of data may be opted into by the homeowner on behalf of the occupants. In some embodiments, sensor 104 may query the homeowner for any data elements described herein and/or not otherwise automatically accessed by sensor 104.

In the exemplary embodiment, sensor 104 may access aerial data of building 102, such as satellite-, aerial-, and/or drone-captured overhead images of building 102 and/or surrounding property. Aerial data may be used to determine various externally visible features of home data (e.g., via digital image processing, machine learning, and/or human analysis). For example, sensor 104 may use aerial data to determine structural elements of the building 102 and/or surrounding property, such as whether building 102 has a swimming pool, a fence, and/or a deck, how many garages building 102 has, or the like. Sensor 104 may use aerial data to determine whether building 102 has trees nearby (e.g., which may cause damage to building 102) and/or whether building 102 is located on a cul-de-sac and/or a busy road. Aerial data may be provided by a third party and/or public external data source 215 (e.g., United States Geological Survey ("USGS"), National Aeronautics and Space Administration ("NASA"), NOAA, Google®, or the like) and/or may be privately collected (e.g., via aerial and/or drone photography of the building 102 by the insurance provider, realtor, or the like). Aerial data may include global positioning system ("GPS") location data for building 102.

Sensor 104 may train a model of satellite images of buildings 102 with labeled data of buildings 102 indicating, for example, whether buildings 102 have pools, decks, nearby trees, and/or other such features. As such, the trained model may be configured to automatically evaluate an unlabeled home (e.g., building 102 in FIG. 1) to determine whether such features are present and/or otherwise categorize building 102 with respect to those features.

In some embodiments, sensor 104 may access mapping data around the building 102 to determine various home health features. Sensor 104 may utilize a web mapping service (e.g., Google® Maps or the like) as an external data source 215. For example, sensor 104 may access the web mapping service via an application programming interface ("API") that allows sensor 104 to submit, for example, the postal address of the building 102 and/or a GPS coordinate of the building 102 and/or query the web mapping service to provide features such as distances to nearby services (e.g., distance to nearest hospital, fire department, police station, schools, places of worship, parks, grocery stores, to various types of entertainment or other amenities, or the like). Mapping data may be used to determine whether building 102 is situated on a busy and/or isolated road. Sensor 104 may generate a play score for building 102 using the mapping data, where the play score evaluates proximity of building 102 to various types of entertainment or exercise venues, such as proximity to hiking trails, bike paths, sports fields, professional sports venues, restaurants, theaters, or the like).

Exemplary User Device

Figure 3:
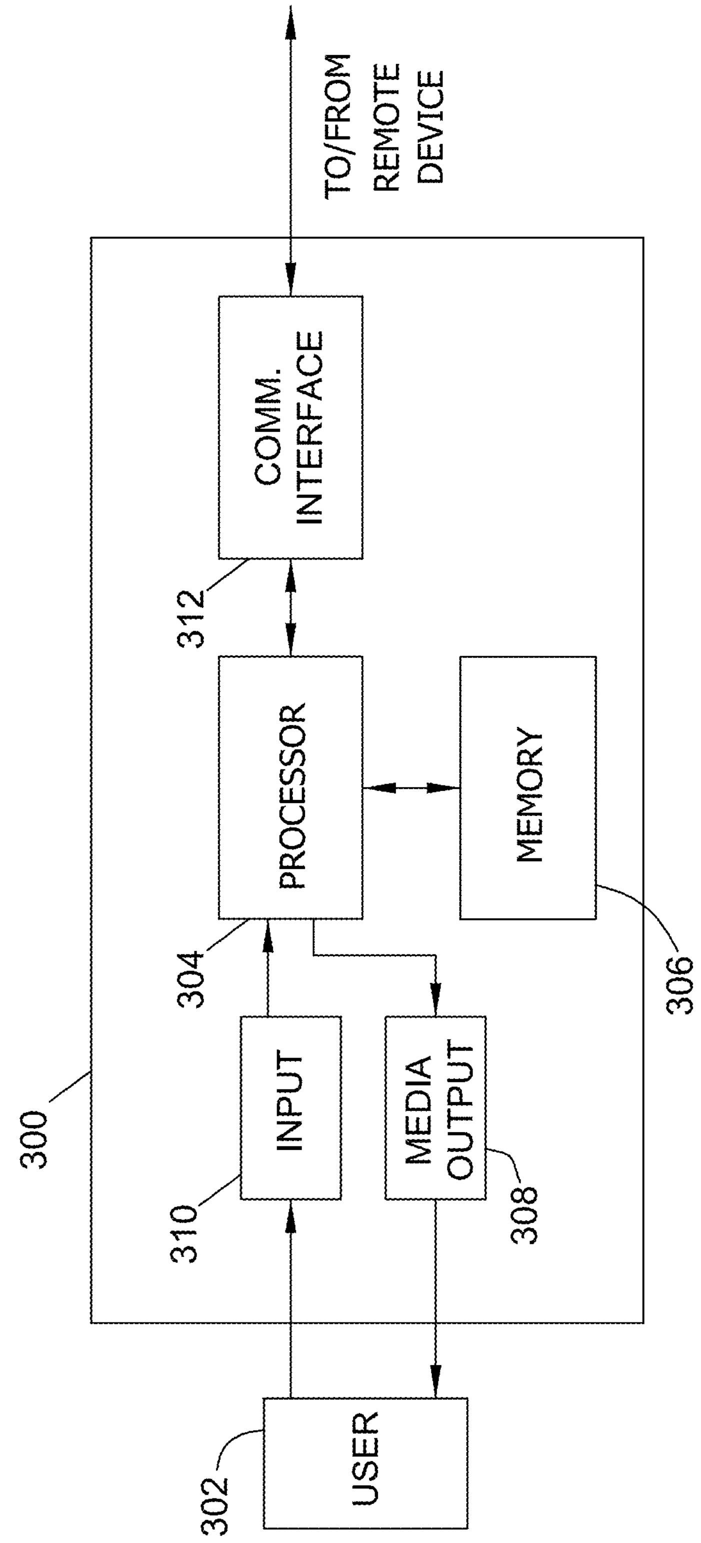
FIG. 3 illustrates an exemplary configuration of a user computer device in accordance with at least one exemplary embodiment of the present disclosure.

FIG. 3 depicts an exemplary configuration of a user computer device 300 (e.g., devices 122-126), in accordance with some embodiments of the present disclosure. User computer device 300 may be operated by a user 302. User computer device 300 may include, but is not limited to, user devices 122-126, (all shown in FIG. 1). User computer device 300 may include a processor 304 for executing instructions. In some embodiments, executable instructions are stored in a memory area 306. Processor 304 may include one or more processing units (e.g., in a multi-core configuration). Memory area 306 may be any device allowing information such as executable instructions and/or data to be stored and retrieved. Memory area 306 may include one or more computer readable media.

User computer device 300 may also include at least one media output component 308 for presenting information to user 302. Media output component 308 may be any component capable of conveying information to user 302. In some embodiments, media output component 308 may include an output adapter (not shown) such as a video adapter and/or an audio adapter. An output adapter may be operatively coupled to processor 304 and operatively couplable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (extended Reality) headsets), and/or voice or chat bots, including bots associated or configured with machine learning and/or generative AI (artificial intelligence) such as ChatGPT or ChatGPT iterations.

In some embodiments, media output component 308 may be configured to present a graphical user interface (e.g., a web browser and/or a client application) to user 302. A graphical user interface may include, for example, an alert generated and/or transmitted by smart sensor 104. In some embodiments, user computer device 300 may include an input device 310 for receiving input from user 302. User 302 may use input device 310 to, without limitation, select a provider.

The user interface displayed by user computer device 300 may include a representation of building 102 (e.g., an image or video stream and/or a virtual image) with an overlay displayed over the representation. For example, the overlay may illustrate locations of the target components, sensor 104, and/or additional sensors 108 within building 102. In addition, the overlay may include other information, such as text instructions, labels, arrows, indicators, and/or other virtual objects that may provide relevant information to the user.

In some embodiments, the user interface including the building information may be displayed through an app executing on, for example, user computer device 300. For example, smart sensor 104 may generate content data configured to cause user computer device 300 to display the user interface. In some embodiments, smart sensor 104 may identify one or more user computing devices 300 (e.g., based upon a geographic location of building 102 and/or user computing devices 300 registered as being associated with individuals taking care of building 102) associated with building 102. Smart sensor 104 may cause the app executing on the identified user computing devices 300 to generate a push notification, and/or transmit a text message, email, and/or other message, prompting a user of user computer device 300 to open the app and access the user interface.

In some embodiments, smart sensor 104 may utilize artificial intelligence (AI), machine learning, and/or chatbot programs (e.g., ChatGPT) to generate textual information to include in the user interface, such as by using ML component 106. In some embodiments, users may submit natural language queries (e.g., via text and/or voice). Based upon the queries, smart sensor 104 may generate a response (e.g., including information derived from the sensor data and/or other sensors) to be presented within the user interface. The information to be displayed may include instructions on how to address certain situations relating to the inquiry. For example, if a leaking pipe is present in building 102, the user may be instructed to turn off a certain valve (a location of which may also be indicated by the overlay), how to access the leaking portion of the pipe, where tools are located in building 102 to fix the pipe (e.g., a location of which may also be indicated by the overlay), where to purchase tools to fix the pipe (e.g., via a hyperlink), where to hire a professional to fix the pipe (e.g., via a hyperlink), and/or how to use the tools to fix the pipe. In some embodiments, smart sensor 104 may provide this information only to users preauthorized by, for example, a corresponding homeowner and/or person in charge of caring for building 102.

In some embodiments, the user interface may include AR and/or VR functionality. In one example, user computer device 300 may be held so that a camera of the user computer device 300 captures a live image, and the image may be displayed by user computer device 300 along with overlayed information. For example, the locations of identified target components of building 102 may be shown as being overlaid upon the image along with addition information (e.g., text instructions, labels, arrows, indicators, and/or other virtual objects).

Input device 310 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 308 and input device 310.

User computer device 300 may also include a communication interface 312, communicatively coupled to a remote device such as servers 118, 120 (shown in FIG. 1). Communication interface 312 may include, for example, a wired or wireless network adapter and/or a wireless data transceiver for use with a mobile telecommunications network.

Stored in memory area 306 are, for example, computer readable instructions for providing a user interface to user 302 via media output component 308 and, optionally, receiving and processing input from input device 310. A user interface may include, among other possibilities, a web browser and/or a client application. Web browsers enable users, such as user 302, to display and interact with media and other information typically embedded on a web page or a website from a server. A client application allows user 302 to interact with, for example, a server. For example, instructions may be stored by a cloud service, and the output of the execution of the instructions sent to the media output component 308.

Processor 304 executes computer-executable instructions for implementing aspects of the disclosure. In some embodiments, the processor 304 is transformed into a special purpose microprocessor by executing computer-executable instructions or by otherwise being programmed.

Exemplary Server Device

Figure 4:
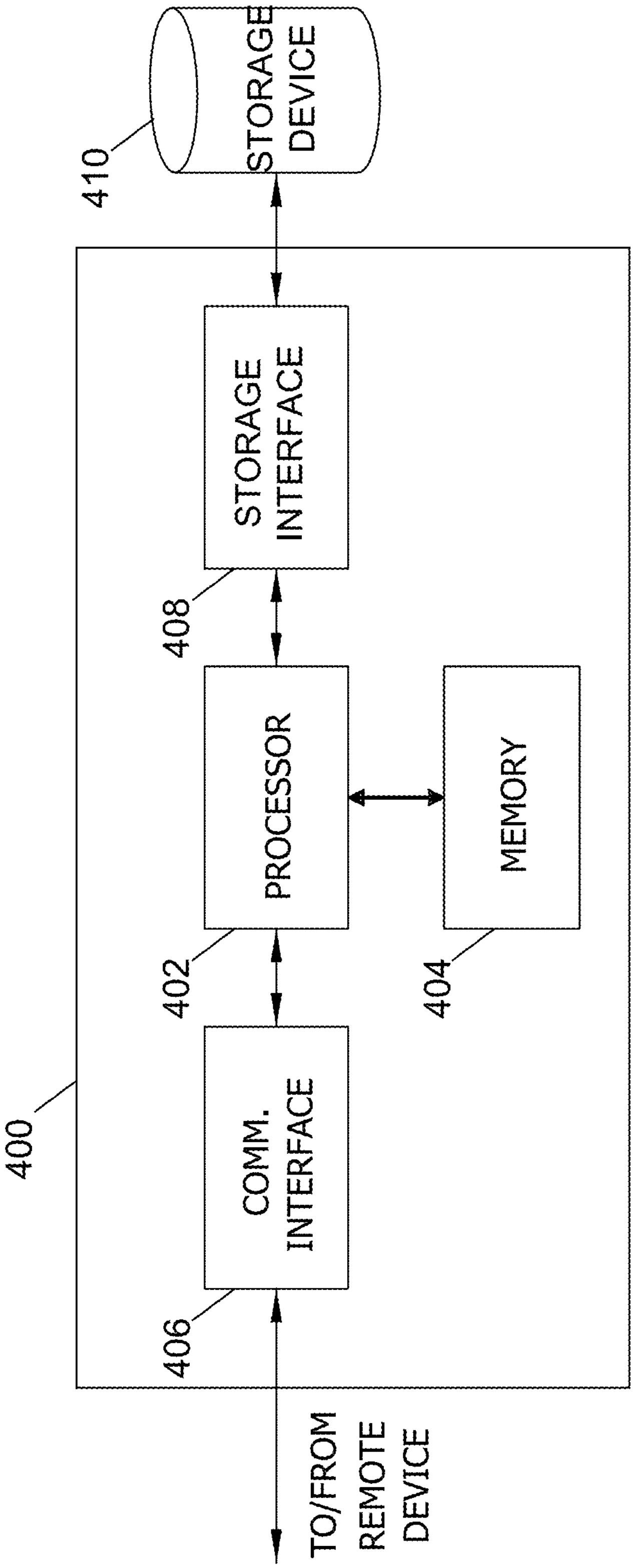
FIG. 4 illustrates an exemplary configuration of a server computing device in accordance with at least one exemplary embodiment of the present disclosure.

FIG. 4 depicts an exemplary configuration of a server computing device 400 (e.g., servers 118, 120 shown in FIG. 1), in accordance with some embodiments of the present disclosure. Server computer device 400 may include, but is not limited to, servers 118, 120. Server computer device 400 may also include a processor 402 for executing instructions. Instructions may be stored in a memory area 404. Processor 402 may include one or more processing units (e.g., in a multi-core configuration).

Processor 402 may be operatively coupled to a communication interface 406 such that server computer device 400 is capable of communicating with a remote device such as another server computer device 400. For example, communication interface 406 may receive requests from user device 122-126 via the Internet (e.g., and/or network 116, as illustrated in FIG. 1).

Processor 402 may also be operatively coupled to a storage device 410. Storage device 410 may be any computer-operated hardware suitable for storing and/or retrieving data. In some embodiments, storage device 410 may be integrated in server computer device 400. For example, server computer device 400 may include one or more hard disk drives as storage device 410.

In other embodiments, storage device 410 may be external to server computer device 400 and may be accessed by a plurality of server computer devices 400. For example, storage device 410 may include a storage area network (SAN), a network attached storage (NAS) system, and/or multiple storage units such as hard disks and/or solid state disks in a redundant array of inexpensive disks (RAID) configuration.

In some embodiments, processor 402 may be operatively coupled to storage device 410 via a storage interface 408. Storage interface 408 may be any component capable of providing processor 402 with access to storage device 410. Storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 410.

Processor 402 may execute computer-executable instructions for implementing aspects of the disclosure. In some embodiments, processor 402 may be transformed into a special purpose microprocessor by executing computer-executable instructions or by otherwise being programmed. For example, processor 402 may be programmed with the instructions such as illustrated in FIG. 5.

In some embodiments, server computing device 400 may include an energy evaluation engine that may evaluate data associated with energy usage in a home to evaluate various risks associated with building 102. For example, energy usage patterns and/or sensor profiles may correlate to a certain level of risk of damage occurring to building 102. Server computing device 400 may use numerous data points to evaluate risks to a residential property and/or may compute a composite risk score and/or various focused risk scores for the property. The risk score (e.g., or likelihood of damage score) may be a numeric value and/or a category (e.g., excellent, good, fair, and poor). Risk scores may be used, for example by an insurance provider, to evaluate insurability of the property and/or its assets, to price insurance policy options for the property, and/or to provide policy discounts and/or verify compliance for risk mitigating changes, actions, and/or behaviors. Further, risk scores may be used to determine recommended actions (e.g., maintenance) to be taken. In some embodiments, the energy evaluation engine may be managed, trained, and/or implemented using ML component 106.

Exemplary Computer-Implemented Method for Detecting Hazards

Figure 5:
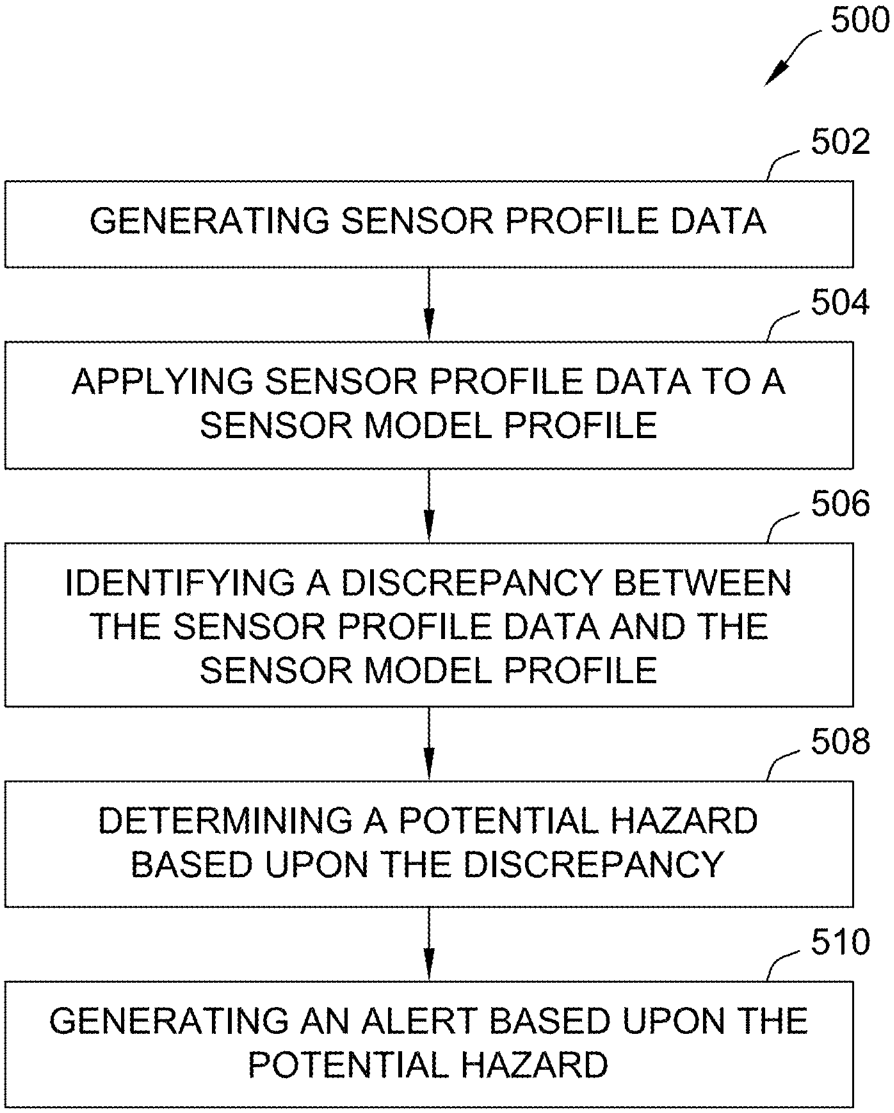
FIG. 5 illustrates a flow diagram of an exemplary computer-implemented method for detecting hazards in accordance with at least one exemplary embodiment of the present disclosure.

FIG. 5 illustrates a flow diagram of an exemplary computer-implemented method 500 for detecting hazards, in accordance with some embodiments of the present disclosure.

In the example shown in FIG. 5, method 500 includes generating 502 sensor profile data associated with a location of a sensor based upon sensor data generated by the sensor and applying 504 the sensor profile data to a sensor model profile associated with the location and stored in at least one memory wherein the sensor model profile includes a plurality of parameter levels for the location proximate to the sensor generated by a machine learning model.

Method 500 further includes identifying 506 a discrepancy between the sensor profile data and the sensor model profile, determining 508 a potential hazard at the location based upon the discrepancy between the sensor profile data and the sensor model profile, and generating 510 an alert based upon the potential hazard at the location.

In some embodiments of method 500, the sensor is in communication with a plurality of sensors associated with the location, the plurality of sensors being different from the sensor, and method 500 further includes receiving additional sensor data from the plurality of sensors and generating the sensor profile data further based upon the additional sensor data. Further, the plurality of sensors may include an electric vehicle (EV) sensor for monitoring charging of an EV wherein the potential hazard is associated with a potential electrical hazard associated with the charging of the EV.

In some embodiments, method 500 further includes receiving an input indicating that normal conditions are present at the location, generating initial sensor profile data based upon the location, inputting the initial sensor profile data to the machine learning model, receiving the sensor model profile as an output from the machine learning model, and storing the sensor model profile in the at least one memory as being associated with the location.

In some embodiments, method 500 further includes receiving another input indicating that the sensor has been moved to a different location, generating updated sensor profile data associated with the different location based upon updated sensor data generated by the sensor at the different location, inputting the updated sensor profile data to the machine learning model, receiving an updated sensor model profile as an output from the machine learning model wherein the updated sensor model profile includes a plurality of updated parameter levels for the different location, and storing the updated sensor model profile in the at least one memory as being associated with the different location.

Further, method 500 may include generating new updated sensor profile data associated with the different location proximate to the sensor based upon new updated sensor data generated by the sensor, applying the new updated sensor profile data to the updated sensor model profile, identifying a discrepancy between the new updated sensor profile data and the updated sensor model profile, determining a potential hazard at the different location based upon the discrepancy between the new updated sensor profile data and the updated sensor model profile, and generating a second alert based upon the potential hazard at the different location.

In some embodiments, computer-implemented method 500 further includes determining a severity level of the potential hazard at the location and determining the alert from a plurality of alert options based upon the severity level wherein the plurality of alert options include an audible alert outputted by the sensor and an alert message transmitted by the sensor to a computer device associated with the location.

In some aspects, computer-implemented method 500 may detect hazards and/or analyze sensor data, such as data from an e-nose or other smart sensor. The method may be implemented via one or more local or remote processors, servers, transceivers, sensors, smart sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another. All of the electronic or electrical components may be configured to operate as input and/or output devices. For instance, various types of voice bots or chatbots may be configured to interact with a human user or other computing devices.

Exemplary Server Computing Device

Figure 6:
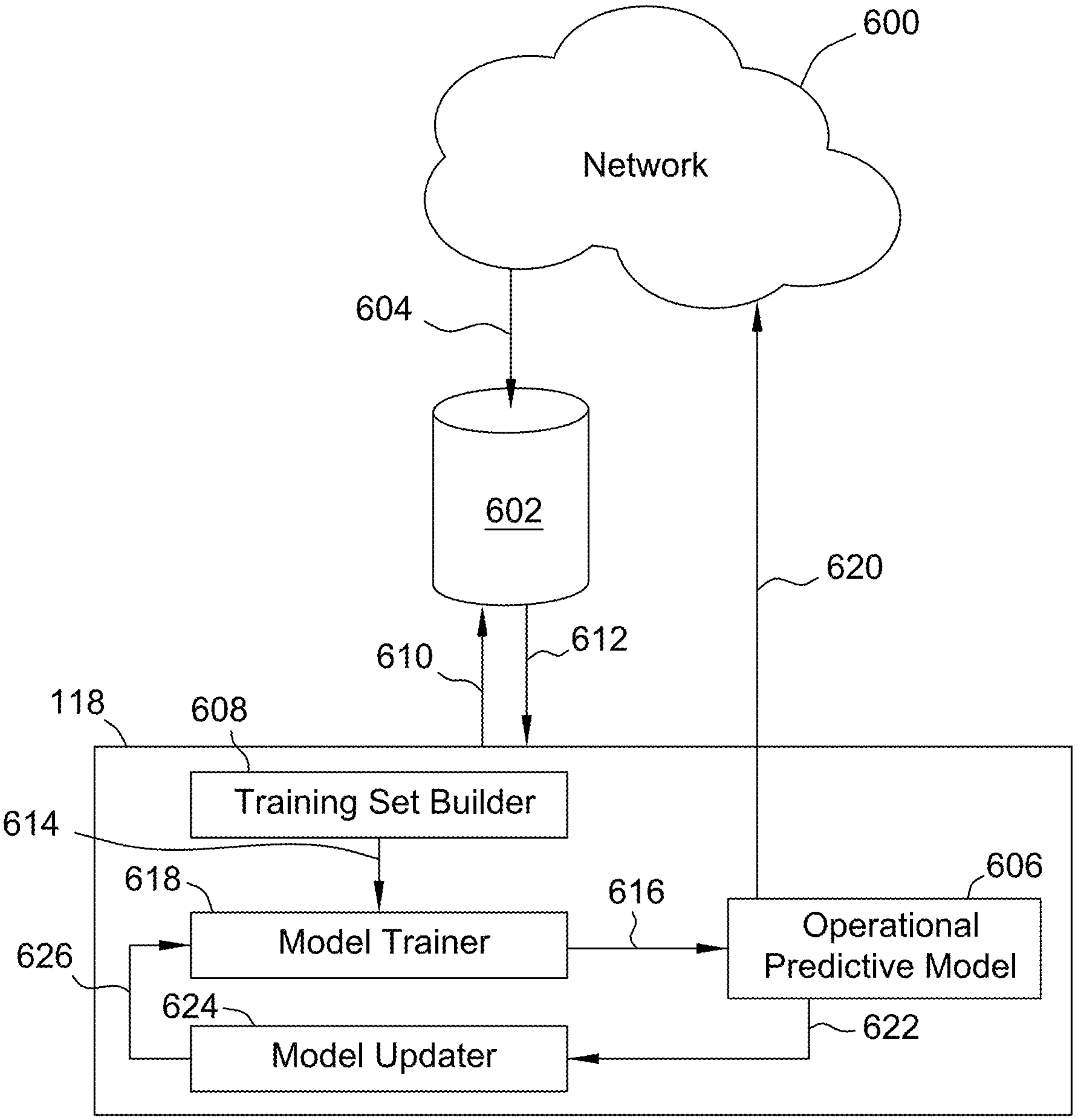
FIG. 6 illustrates a block diagram of part of the exemplary sensor system shown in FIG. 1 in accordance with at least one exemplary embodiment of the present disclosure.

FIG. 6 is a schematic diagram illustrating further detail of an exemplary embodiment of ML server 118. ML server 118 may communicate with other components of smart sensor 104, such as ML component 106, sensors 108, and/or user devices 122-126, via a network 600. ML server 118 may include and/or be in communication with a database 602 that stores data 604 including home data and/or other information relevant to generating recommendations for buildings 102. Data 604 received from network 600 may be stored in database 602. ML server 118 may configured to use data 604 to generate an operational predictive model 606 for generating recommendations associated with connected home devices based on home data corresponding to a particular building 102. In some embodiments, ML server 118 may use operational predictive model 606 to assist smart sensor 104 in identifying discrepancies in local conditions to identify when a hazard or other notable condition is occurring or about to occur.

In exemplary embodiments, ML server 118 includes a training set builder module 608 configured to submit one or more queries 610 to database 602 to retrieve subsets 612 of data 604, and to use those subsets 612 to build training data sets 614 for generating operational predictive model 606. For example, query 610 may be configured to retrieve certain fields from data 604 for buildings 102 having certain similar aspects, such as being located in similar (e.g., nearby) geolocations.

In exemplary embodiments, training set builder module 608 may be configured to derive training data sets 614 from retrieved subsets 612. Each training data set 614 corresponds to historical data 604 ("historical" in this context means completed in the past, as opposed to completed in real-time with respect to the time of retrieval by training set builder module 608). Each training data set 614 may include "model input" data fields along with at least one "result" data field representing historical feedback, such as insurance claims in the area of buildings 102, feedback received from homeowners, decisions made by homeowners based upon previous recommendations, and/or changes to which sensors 108 and/or IoT devices are installed in buildings 102. The model input data fields represent factors that may be expected to, or unexpectedly be found during model training to, have some correlation with reducing risk and/or improving safety of buildings 102.

In exemplary embodiments, the model input data fields in training data sets 614 may be generated from data fields in subset 612 corresponding to historical data 604. In other words, a trained machine learning model 616 produced by a model trainer module 618 for use by operational predictive model 606 is trained to make predictions based on input values that can be generated from the data fields in data 604. Values in the model input data fields may include values copied directly from values in a corresponding data field in the retrieved subset 612, and/or values generated by modifying, combining, or otherwise operating upon values in one or more data fields in the retrieved subset 612. Values in the model input data fields may include sensors 108 and/or IoT devices that may be installed in buildings 102 and/or the IoT devices or sensors that have already been installed in a particular building 102. The use of such data fields as model input data fields facilitates the machine learning model in weighing these factors directly.

After training set builder module 608 generates training data sets 614, training set builder module 608 passes the training data sets 614 to model trainer module 618. In example embodiments, model trainer module 618 is configured to apply the model input data fields of each training data set 614 as inputs to one or more machine learning models. Each of the one or more machine learning models is programmed to produce, for each training data set 614, at least one output intended to correspond to, or "predict," a value of the at least one result data field of the training data set 614. "Machine learning" refers broadly to various algorithms that may be used to train the model to identify and recognize patterns in existing data in order to facilitate making predictions for subsequent new input data.

Model trainer module 618 is configured to compare, for each training data set 614, the at least one output of the model to the at least one result data field of the training data set 614, and apply a machine learning algorithm to adjust parameters of the model in order to reduce the difference or "error" between the at least one output and the corresponding at least one result data field. In this way, model trainer module 618 trains the machine learning model to accurately predict the value of the at least one result data field. In other words, model trainer module 618 cycles the one or more machine learning models through the training data sets 614, causing adjustments in the model parameters, until the error between the at least one output and the at least one result data field falls below a suitable threshold, and then uploads at least one trained machine learning model 616 to operational predictive model 606 (e.g., and/or sensor 104) for application to generate recommendations 620. In example embodiments, model trainer module 618 may be configured to simultaneously train multiple candidate machine learning models and/or to select the best performing candidate for each result data field, as measured by the "error" between the at least one output and the corresponding result data field, to upload to operational predictive model 606.

In certain embodiments, the one or more machine learning models may include one or more neural networks, such as a convolutional neural network, a deep learning neural network, or the like. The neural network may have one or more layers of nodes, and the model parameters adjusted during training may be respective weight values applied to one or more inputs to each node to produce a node output. In other words, the nodes in each layer may receive one or more inputs and apply a weight to each input to generate a node output. The node inputs to the first layer may correspond to the model input data fields, and the node outputs of the final layer may correspond to the at least one output of the model, intended to predict the at least one result data field. One or more intermediate layers of nodes may be connected between the nodes of the first layer and the nodes of the final layer. As model trainer module 618 cycles through the training data sets 614, model trainer module 618 may apply a suitable backpropagation algorithm to adjust the weights in each node layer to minimize the error between the at least one output and the corresponding result data field. In this fashion, the machine learning model is trained to produce output that reliably predicts the corresponding result data field. Alternatively, the machine learning model may have any suitable structure.

In some embodiments, model trainer module 618 provides an advantage by automatically discovering and properly weighting complex, second- or third-order, and/or otherwise nonlinear interconnections between the model input data fields and the at least one output. Absent the machine learning model, such connections are unexpected and/or undiscoverable by human analysts.

In exemplary embodiments, operational predictive model 606 may compare feedback (e.g., insurance claims in the area of buildings 102, feedback received from homeowners, decisions made by homeowners based upon previous recommendations, changes to which IT devices and/or sensors 108 are installed in buildings 102), and may route a comparison result 622 generated by comparing recommendation 620 to the feedback to a model updater module 624 of ML server 118. Model updater module 624 is configured to derive a correction signal 626 from comparison results 622 received for one or more recommendations 620, and to provide correction signal 626 to model trainer module 618 to enable updating or "re-training" of the at least one machine learning model to improve performance. The retrained at least one machine learning model 616 may be periodically re-uploaded to operational predictive model 606.

In some embodiments, functionality described herein with respect to ML server 118 may be implemented additionally and/or alternatively at sensor 104 (e.g., generating and/or updating one or more models).

Exemplary System for Generating Recommendations

Figure 7:
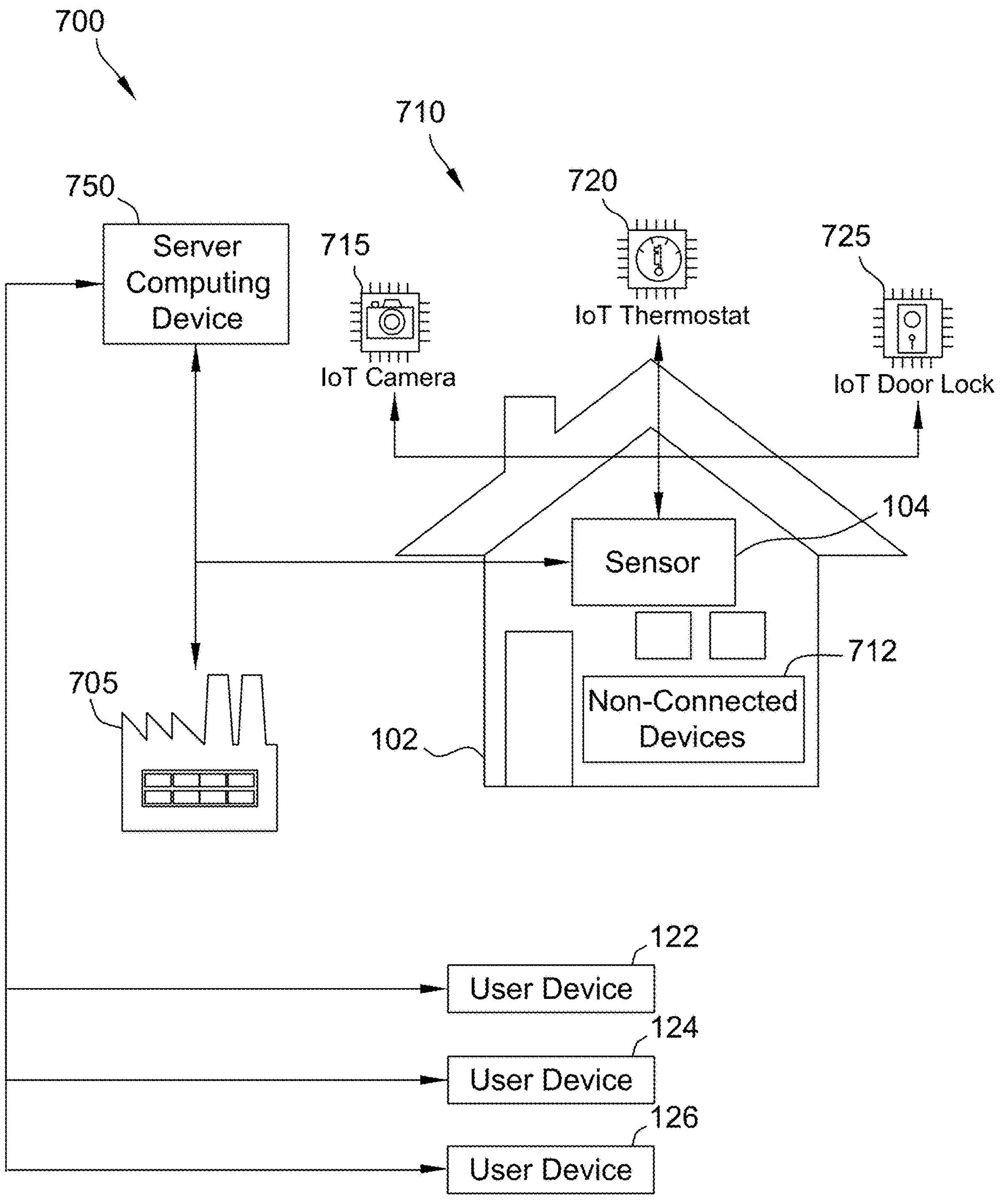
FIG. 7 illustrates an exemplary computer system for generating AI-based recommendations in accordance with at least one exemplary embodiment of the present disclosure.

FIG. 7 illustrates an exemplary computer system 700 for generating AI-based recommendations, in accordance with the present disclosure. System 700 illustrates smart sensor 104 receiving, analyzing, and/or reporting data from devices associated with building 102.

In the exemplary embodiment, a manufacturer server 705 may be associated with one or more IoT devices 710 (e.g., 715, 720, 725) and/or non-connected devices 712. IoT devices 710 and/or non-connected devices 712 may be in or around building 102. IoT devices 710 may include, but are not limited to, IoT cameras 715, IoT thermostats 720, IoT door locks 725, and/or any other internet connected device, including, but not limited to, appliances (e.g., smart appliances), user devices 122-126 which may be mobile devices, laptops, appliances, and/or a mobile phones, one or more voice or chat bots, a computer device, including, but not limited to, a desktop computer and/or a router, and/or smart sensor 104.

In some embodiments, smart sensor 104 is in wired and/or wireless communication IoT devices 710 in building 102. In some embodiments, smart sensor 104 may be a router or Wi-Fi providing device in building 102. In some embodiments, smart sensor 104 is a smart home controller that controls one or more of IoT devices 710 and may provide communication between the user and individual IoT devices 710.

Non-connected devices 712 may include appliances and/or other home devices that are not connected to the internet. For example, certain non-connected devices 712 may be incapable of internet connection and/or devices a homeowner has opted not to connect to the internet. Non-connected devices may be registered with manufacturer server 705 and/or server computing device 750 via user input. For example, a homeowner may input information (e.g., manufacturer, model, serial number) about non-connected devices 712 via a mobile application and/or web page, and or input images, such as QR codes and/or bar codes, based upon which server computing device may identify the non-connected devices 712 (e.g., by performing a lookup in a database associating the QR codes and/or bar codes with specific non-connected devices 712). In some embodiments, server computing device 750 may be capable of identifying a non-connected device 712 based upon an image (e.g., an image of the entire non-connected device 712) input by the user using machine learning or AI-based image analysis techniques.

In some embodiments, each IoT device 710 may collect data about building 102 either directly or indirectly. For example, a smart light bulb may report when the bulb is on or off. This may indirectly indicate whether or not an individual is near the bulb. In the at least one embodiment, many IoT devices 710 are in communication with one or more servers of manufacturer server 705. Manufacturer server 705 may provide additional services, such as remote activation. Manufacturer server 705 may also collect data observed by IoT devices 710, including, but not limited to, usage data about IoT devices 710.

In some embodiments, a server computing device 750 may be in communication with IoT devices 710, smart sensor 104, and/or manufacturer servers 705. In some embodiments, functionality described herein with respect to server computing device 750 may be implemented additionally and/or alternatively at sensor 104 (e.g., generating and/or updating one or more models, generating recommendations, etc.).

Server computing device 750 may collect data from IoT devices 710 for use in determining recommendations for additional IoT devices 710 and/or other connected home devices that may be installed in building 102. Server computing device 750 may determine one or more products and/or services that may reduce risk and/or improve safety of building 102. Server computing device 750 may be in communication with one or more user devices 122-126 associated with respective homeowners, though which server computing device 750 may present generated recommendations, for example, recommendations relating to a remaining lifetime of an appliance or certain maintenance steps that should be taken to extend the lifetime of the appliance.

In the exemplary embodiment, server computing device 750 may build an AI model that receives inputs about appliances and/or other devices installed in building 102 (sometimes referred to herein as "appliance data"). In some embodiments, the AI model may additionally receive historical data relating to other appliances (sometimes referred to herein as "historical appliance data"), such as those similar (e.g., or a similar manufacturer, model, and/or age) to those installed in building 102. The historical appliance data may include historical data relating to lifetimes or how long other appliances lasted before needing to be repaired or replaced. The received data may be used to train the AI model, to output predictions (e.g., a score or countdown relating to an expected remaining lifetime of the appliances and/or recommendations (e.g., measures that can be taken to extend a lifetime or otherwise improve functioning of an appliance)), as described in further detail below. In some embodiments, the AI model may be implemented using ML component 106.

In the exemplary embodiment, server computing device 750 may build the model to output predictions relating to a remaining lifetime of a particular appliance (e.g., IoT device 710 or non-connected device 712). For example, the model may output a predicted amount of time (e.g., a countdown)

remaining before an appliance needs to be replaced. The output may further include recommendations for steps (e.g., preventative maintenance) that can be taken to prolong the lifetime of the appliance. In cases where there are multiple maintenance actions and/or a homeowner has multiple registered appliances each with one or more recommended maintenance actions, the output may further include a recommended order in which to perform the maintenance actions, for example, to reduce a risk of an appliance failing and/or to most cost-effectively prolong the lifetimes of the appliances. For example, the recommended maintenance actions may be prioritized based on, for example, how likely each appliance is to fail (e.g., by prioritizing appliances with lesser expected remaining lifetimes), the practical and financial ease of carrying out the recommendations (e.g., whether they involve hiring professional services and/or ordering new parts), and/or other such factors. The output generated by the AI model may further include recommendations on where to purchase or obtain products and/or services in the area relating to the recommended maintenance actions.

In some embodiments, server computing device 750 may retrieve appliance data relating to appliances a homeowner has registered. Server computing device 750 may record appliance data associated with the appliances of the homeowner in a user profile associated with the homeowner. In some embodiments, server computing device 750 may prompt (e.g., via user devices 122-126) the homeowner to submit a list of one or more currently-installed appliances, for example, as a fillable form, an image of a QR-code, bar code, and/or another visible identifier, a serial number, an image of the appliance, a voice prompt, and/or a text prompt, and/or may receive a natural language query from the homeowner including at least one currently-installed appliances and inquiring for an expected remaining lifetime of the appliance. In some embodiments in which one or more of the appliances are connected devices capable of communicating with other components of system 700, server computing device 750 may retrieve appliance data relating to IoT devices 710 currently installed within building 102 on its own. For example, server computing device 750 may communicate with smart sensor 104 that communicates with each of IoT devices 710 in building 102 and retrieve information about the connected devices via smart sensor 104.

In some embodiments, based upon the data inputted by the user, server computing device 750 may retrieve additional appliance data relating to an appliance that may be used to predict a lifetime and/or determine maintenance recommendations. For example, server computing device 750 may determine an age and/or installation date of an appliance based upon, for example, a serial number of the appliance, transaction data relating to an initial purchase of the appliance, and/or previous registrations of the appliance with server computing device 750 (e.g., if the appliance has been registered by a previous owner and sold or transferred to the current owner). Other examples of information that may be helpful in predicting a lifetime of a particular appliance (sometimes referred to herein as "contextual data") may include, but are not limited to, a repair or maintenance history of the appliance, demographic information relating to users of the appliance (e.g., appliances accessible by children may sometimes be treated roughly), crowdsourced data relating to the appliance, data retrieved from a manufacturer of the appliance, a geographic location in which the appliance is located (e.g., whether the appliance may have been exposed to extreme temperatures, humidity, hard water, seismic activity, etc.), previous insurance and/or warranty claims relating to the appliance, attributes of the home in which the appliance is installed (e.g., power usage, power outage statistics, data gathered from sensors and/or home controllers, water usage, temperatures, doors and/or windows being open or closed, current and future weather conditions, etc.), how often the appliance has been used during its lifetime, and/or other information relating the appliance. In some embodiments, at least some of the appliance data may be retrieved from manufacturer server 705, smart sensor 104, and/or user devices 122-126.

In the exemplary embodiment, the AI model may compute and/or output an expected remaining lifetime for an appliance based upon the retrieved data. The remaining lifetime may be expressed and/or displayed as a countdown value that decreases as time progresses indicating how much of the appliance's life cycle remains. The AI model may also determine an estimated value of how much it will cost to repair or replace the appliance as it ages and gets closer to its end-of-life date. In some embodiments, the estimated remaining lifetime may periodically be updated, for example, in response to the homeowner inputting and/or server computing device 750 retrieving new data about the appliance and/or the AI model itself being updated based upon new training data.

In some embodiments, the AI model may further generate recommendations for extending the lifetime of the appliance based upon the retrieved data. The recommendation may include specific maintenance actions that may prolong the lifetime of the product. In some embodiments, the recommendations may include services and/or parts for performing the maintenance and/or may prompt the homeowner to indicate whether the homeowner would like to purchase the recommended services and/or parts. The system may further provide additional information relating to the recommended maintenance actions, such as advantages of the particular maintenance actions, costs, potential cost savings (e.g., due to extending the lifetime of the appliance and/or other costs, such as reducing insurance and/or energy costs), when and/or how to perform the maintenance actions, and/or alternative options. In some embodiments, the recommendations may be generated in response to query by the homeowner (e.g., in conjunction with computing the estimated remaining lifetime of the appliance) and/or may be periodically generated automatically (e.g., as a monthly report to the homeowner).

In the exemplary embodiment, the AI model may output data in a data interchange format such as JavaScript Object Notation (JSON), which may be interpreted by other components of system 700 (e.g., user devices 122-126) to display information such as the predicted remaining lifetime and/or corresponding recommendations. For example, in embodiments in which the predicted remaining lifetime and/or recommendations are displayed via a mobile application (e.g., executed on user devices 122-126), the mobile application may be configured to generate a user interface (e.g., including text, lists, shapes, colors, sounds, etc.) for presenting the predicted remaining lifetime and/or recommendations based on data output by the AI model.

In the exemplary embodiment, the predicted remaining lifetime and/or recommendations are presented to the homeowner. For example, server computing device 750 may provide content data to user devices 122-126 that causes user devices 122-126 to present the predicted remaining lifetime and/or recommendations. The predicted remaining lifetime and/or recommendations may be presented as a graphical user interface by a mobile application and/or web page. The recommendations may include a maintenance schedule and/or a curated plan and set of reminders for when certain maintenance actions should be performed. In addition to the predicted remaining lifetime and/or recommendations, the mobile application and/or web page may provide additional information relating to the appliance, such as, for example, replacement parts and links to purchase the replacement parts, owner's manual, warranty information, Energy Star rating. In some embodiments, the predicted remaining lifetime and/or recommendations may be presented as a natural language response, which may include text and/or synthesized speech.

In some embodiments, the recommendations may include a maintenance schedule and/or a curated plan and set of reminders for when certain maintenance actions should be performed. In some embodiments, the recommendations may include a list, for example, a list of ten maintenance actions that can prolong the lifetime of the appliance. In some embodiments, recommendations may include a timeline and/or a recommended order for performing maintenance actions on one or more appliances in the home. The recommendation list may be presented through a user interface that enables the homeowner to select and/or click on listed maintenance actions to automatically purchase and/or schedule parts and/or services associated with the maintenance action. In some embodiments, the recommendation may further indicate a potential increase in the appliance's lifetime and/or potential cost savings (e.g., replacement costs and/or insurance and/or energy savings) that may result from performing a certain maintenance action. If a recommended action is performed, server computing device 750 may automatically update the predicted remaining lifetime associated with the appliance.

In some embodiments, server computing device 750 may also notify an insurer of building 102, so that the insurer may adjust a premium associated with the home accordingly. Server computing device 750 may continually update the recommendations based on newly received data, feedback received from homeowners, and/or decisions made by homeowners based upon previous recommendations. The newly received data may also be used to update the predicted remaining lifetime. This may enable a gamification element, in which the homeowner may be rewarded for performing recommended maintenance actions by seeing an increase in the predicted remaining lifetime of the appliance in the user interface.

In the example embodiment, feedback may be used to continually update the AI model. For example, new data relating to lifetimes of appliances, insurance and/or warranty claims relating to appliances, feedback received from homeowners, decisions made by homeowners based upon previous recommendations, and/or other information may be used to update the AI model.

Server computing device 750 may also be in communication with one or more marketplaces that provide access to and/or matching with companies and/or individuals that provide products (e.g., replacements for appliances) and/or services (e.g., maintenance services) recommended by the AI model. In some embodiments, homeowners may be able to list registered appliances on the marketplace for sale and/or transfer to other homeowners. Transferring ownership of an appliance via the marketplace may enable server computing device 750 to automatically register the appliance with a new owner. Other examples of products and/or services provided by the marketplace include, but are not limited to, plumbers, smart home devices, security systems, maintenance, such as for an appliance and/or an HVAC (heating, ventilation, and air conditioning) system, and/or insurance.

In some embodiments, server computing device 750 may include an energy evaluation engine that may evaluate data associated with appliances installed in a home to evaluate various risks associated with the home. In some embodiments, the energy evaluation engine may evaluate data associated with the sensor data profile, sensor model profile, and e-nose sensor to evaluate various environmental and/or atmospheric risks. For example, certain appliances may pose a risk of damaging the home when reaching an end of their lifetime, or certain compounds may be noted in the air that pose a health risk. Server computing device 750 may use numerous data points to evaluate risks to a residential property and/or may compute a composite risk score and/or various focused risk scores for the property. The risk score or likelihood of damage score may be a numeric value and/or a category (e.g., excellent, good, fair, and poor).

Risk scores may be used, for example by an insurance provider, to evaluate insurability of the property and its assets, to price insurance policy options for the property, or to provide policy discounts and verify compliance for risk mitigating changes, actions, and/or behaviors. Further, risk scores may be used to determine to recommend certain appliances be replaced or to perform maintenance on the appliances. For example, appliances that, if replaced or serviced, would provide a greater reduction to the risk score may be prioritized. In some embodiments, server computing device 750 may generate a risk score for different categories of risk, such as property risk, fire protection, and/or safety, which may be presented individually within the user interface with related recommendations. For example, the fire protection rating may be displayed along with fire-protection related recommendations, such as recommendation relating to products that may result in a reduction of fire risk if implemented (e.g., replacing appliances that tend to draw excessive electrical currents and/or cause electrical shorts when the appliances are near the end of their lifetime).

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

In some embodiments, system 100 is configured to implement machine learning (e.g., via ML component 106 and/or ML server 118), such that system 100 "learns" to analyze, organize, and/or process data without being explicitly programmed. Machine learning may be implemented through machine learning methods and algorithms ("ML methods and algorithms"). In some embodiments, a machine learning module ("ML module") is configured to implement ML methods and/or algorithms (e.g., at ML server 118). In some embodiments, ML methods and algorithms are applied to data inputs and generate machine learning outputs ("ML outputs").

In some embodiments, at least one of a plurality of ML methods and/or algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In some embodiments, the implemented ML methods and/or algorithms are directed toward at least one of a plurality of categorizations of machine learning, such as supervised learning, unsupervised learning, and/or reinforcement learning.

In some embodiments, ML component 106 may employ supervised learning, which involves identifying patterns in existing data to make predictions about subsequently received data. Specifically, ML component 106 is "trained" using training data (e.g., stored at ML server 118), which includes example inputs and associated example outputs. Based upon the training data, ML component 106 may generate a predictive function which maps outputs to inputs and may utilize the predictive function to generate ML outputs (e.g., associated with generating an alert) based upon data inputs (e.g., sensor data). In some embodiments, a processing element may be trained by being provided with and/or detecting a large sample of building attributes associated with building 102 (e.g., certain thresholds and/or parameters associated with normal, non-hazardous conditions).

In some embodiments, ML component 106 may employ unsupervised learning, which involves finding meaningful relationships in unorganized data. Unlike supervised learning, unsupervised learning does not involve user-initiated training based upon example inputs with associated outputs. Rather, in unsupervised learning, ML component 106 may organize unlabeled data according to a relationship determined by at least one ML method/algorithm employed by ML component 106. Unorganized data may include any combination of data inputs and/or ML outputs as described above.

In some embodiments, ML component 106 may employ reinforcement learning, which involves optimizing outputs based upon feedback from a reward signal (e.g., associated with whether or not a hazard and/or potential hazard was correctly identified). Specifically, ML component 106 may receive a user-defined reward signal definition, receive a data input, utilize a decision-making model to generate a ML output based upon the data input, receive a reward signal based upon the reward signal definition and the ML output, and alter the decision-making model (e.g., re-training) so as to receive a stronger reward signal for subsequently generated ML outputs. Other types of machine learning may also be employed, including deep and/or combined learning techniques.

In some embodiments, ML models may be utilized along with voice bots and/or chatbots to implement artificial intelligence and/or machine learning techniques. For instance, the voice or chatbot may be a ChatGPT chatbot. The voice and/or chatbot may employ supervised or unsupervised machine learning techniques, which may be followed by, and/or used in conjunction with, reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption. Based upon these analyses, the processing element may learn how to identify characteristics and patterns that may then be applied to identifying hazards.

Exemplary Embodiments

The present embodiments may relate to, inter alia, improved computer-based security systems and computer-implemented methods for detecting hazards using all-in-one monitoring smart sensors. The computer systems and computer-implemented methods may generate and analyze data relating to an environment and/or condition of a building and/or outdoor location. The computer systems and methods described herein may include smart sensors for detecting certain data points and artificial intelligence and/or machine learning tools to detect hazards from the gathered data points at various locations such as within or near buildings or at outdoor locations.

In some aspects, a sensor for detecting hazards may be provided. The sensor may include at least one memory with instructions stored thereon and/or at least one processor in communication with the at least one memory wherein the instructions, when executed by the at least one processor, cause the at least one processor to generate sensor profile data associated with a location proximate to the sensor based upon sensor data generated by the sensor, apply the sensor profile data to a sensor model profile associated with the location and stored in the at least one memory wherein the sensor model profile includes a plurality of parameter levels for the location proximate to the sensor generated by a machine learning model, identify a discrepancy between the sensor profile data and the sensor model profile, determine a potential hazard at the location based upon the discrepancy between the sensor profile data and the sensor model profile, and/or generate an alert based upon the potential hazard at the location.

In some aspects, the sensor may be in communication with a plurality of sensors associated with the location, the plurality of sensors may be different from the sensor, and the instructions may further cause the at least one processor to receive additional sensor data from the plurality of sensors and/or generate the sensor profile data further based upon the additional sensor data. In some aspects, the plurality of sensors may include an electric vehicle (EV) sensor for monitoring charging of an EV and/or the potential hazard may be associated with a potential electrical hazard associated with the charging of the EV.

In some aspects, the instructions may further cause the at least one processor to receive an input indicating that normal conditions are present at the location, generate initial sensor profile data based upon the location, input the initial sensor profile data to the machine learning model, receive the sensor model profile as an output from the machine learning model, and/or store the sensor model profile in the at least one memory as being associated with the location.

In some aspects, the instructions may further cause the at least one processor to receive another input indicating that the sensor has been moved to a different location, generate updated sensor profile data associated with the different location based upon updated sensor data generated by the sensor proximate to the different location, input the updated sensor profile data to the machine learning model, receive an updated sensor model profile as an output from the machine learning model wherein the updated sensor model profile includes a plurality of updated parameter levels for the different location, and/or store the updated sensor model profile in the at least one memory as being associated with the different location. In some aspects, the instructions may further cause the at least one processor to generate new updated sensor profile data associated with the different location proximate to the sensor based upon new updated sensor data generated by the sensor, apply the new updated sensor profile data to the updated sensor model profile, identify a discrepancy between the new updated sensor profile data and the updated sensor model profile, determine a potential hazard at the different location based upon the discrepancy between the new updated sensor profile data and the updated sensor model profile, and/or generate a second alert, the second alert based upon the potential hazard at the different location.

In some aspects, the instructions may further cause the at least one processor to determine a severity level of the potential hazard at the location and/or determine the alert from a plurality of alert options based upon the severity level wherein the plurality of alert options include an audible alert outputted by the sensor and an alert message transmitted by the sensor to a computer device associated with the location.

In some aspects, a sensor system for detecting hazards may be provided. The sensor system may include at least one sensor, at least one memory with instructions stored thereon, and/or at least one processor in communication with the at least one memory. The instructions, when executed by the at least one processor, may cause the at least one processor to generate sensor profile data associated with a location proximate to the at least one sensor based upon sensor data generated by the at least one sensor, apply the sensor profile data to a sensor model profile associated with the location and stored in the at least one memory wherein the sensor model profile includes a plurality of parameter levels for the location of the at least one sensor generated by a machine learning model, identify a discrepancy between the sensor profile data and the sensor model profile, determine a potential hazard at the location based upon the discrepancy between the sensor profile data and the sensor model profile, and/or generate an alert based upon the potential hazard at the location.

In some aspects, the at least one sensor may be in communication with a plurality of sensors associated with the location, the plurality of sensors being different from the at least one sensor, and the instructions may further cause the at least one processor to receive additional sensor data from the plurality of sensors and/or generate the sensor profile data further based upon the additional sensor data. In some aspects, the plurality of sensors may include an electric vehicle (EV) sensor for monitoring charging of an EV and the potential hazard may be associated with a potential electrical hazard associated with the charging of the EV.

In some aspects, the instructions may further cause the at least one processor to receive an input indicating that normal conditions are present at the location, generate initial sensor profile data based upon the location, input the initial sensor profile data to the machine learning model, receive the sensor model profile as an output from the machine learning model, and/or store the sensor model profile in the at least one memory as being associated with the location.

In some aspects, the instructions may further cause the at least one processor to receive another input indicating that the at least one sensor has been moved to a different location, generate updated sensor profile data associated with the different location based upon updated sensor data generated by the at least one sensor at the different location, input the updated sensor profile data to the machine learning model, receive an updated sensor model profile as an output from the machine learning model wherein the updated sensor model profile includes a plurality of updated parameter levels for the different location, and/or store the updated sensor model profile in the at least one memory as being associated with the different location. In some aspects, the instructions may further cause the at least one processor to generate new updated sensor profile data associated with the different location of the at least one sensor based upon new updated sensor data generated by the at least one sensor, apply the new updated sensor profile data to the updated sensor model profile, identify a discrepancy between the new updated sensor profile data and the updated sensor model profile, determine a potential hazard at the different location based upon the discrepancy between the new updated sensor profile data and the updated sensor model profile, and/or generate a second alert, the second alert based upon the potential hazard at the different location.

In some aspects, the instructions may further cause the at least one processor to determine a severity level of the potential hazard at the location and/or determine the alert from a plurality of alert options based upon the severity level wherein the plurality of alert options include an audible alert outputted by the at least one sensor and an alert message transmitted by the at least one sensor to a computer device associated with the location.

In some aspects, a computer-implemented method for detecting hazards implemented by at least one processor in communication with at least one memory may be provided. The computer-implemented method may include generating sensor profile data associated with a location proximate to a sensor based upon sensor data generated by the sensor, applying the sensor profile data to a sensor model profile associated with the location and stored in the at least one memory wherein the sensor model profile includes a plurality of parameter levels for the location proximate to the sensor generated by a machine learning model, identifying a discrepancy between the sensor profile data and the sensor model profile, determining a potential hazard at the location based upon the discrepancy between the sensor profile data and the sensor model profile, and/or generating an alert based upon the potential hazard at the location.

In some aspects of the computer-implemented method, the sensor may be in communication with a plurality of sensors associated with the location, the plurality of sensors being different from the sensor, and the computer-implemented method may further include receiving additional sensor data from the plurality of sensors wherein the plurality of sensors includes an electric vehicle (EV) sensor for monitoring charging of an EV and wherein the potential hazard is associated with a potential electrical hazard associated with the charging of the EV and/or generating the sensor profile data further based upon the additional sensor data.

In some aspects, the computer-implemented method may include receiving an input indicating that normal conditions are present at the location, generating initial sensor profile data based upon the location, inputting the initial sensor profile data to the machine learning model, receiving the sensor model profile as an output from the machine learning model, and/or storing the sensor model profile in the at least one memory as being associated with the location.

In some aspects, the computer-implemented method may include receiving another input indicating that the sensor has been moved to a different location, generating updated sensor profile data associated with the different location based upon updated sensor data generated by the sensor proximate to the different location, inputting the updated sensor profile data to the machine learning model, receiving an updated sensor model profile as an output from the machine learning model wherein the updated sensor model profile includes a plurality of updated parameter levels for the different location, and/or storing the updated sensor model profile in the at least one memory as being associated with the different location. In some aspects, the computer-implemented method may include generating new updated sensor profile data associated with the different location proximate to the sensor based upon new updated sensor data generated by the sensor, applying the new updated sensor profile data to the updated sensor model profile, identifying a discrepancy between the new updated sensor profile data and the updated sensor model profile, determining a potential hazard at the different location based upon the discrepancy between the new updated sensor profile data and the updated sensor model profile, and/or generating a second alert, the second alert based upon the potential hazard at the different location.

In some aspects, the computer-implemented method may include determining a severity level of the potential hazard at the location and/or determining the alert from a plurality of alert options based upon the severity level wherein the plurality of alert options include an audible alert outputted by the sensor and an alert message transmitted by the sensor to a computer device associated with the location.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another example, a computer program is provided, and the program may be embodied on a computer-readable medium. In an example, the system may be executed on a single computer system, without requiring a connection to a server computer. In a further example, the system may be being run in a Windows® environment (Windows is a registered trademark of Microsoft Corporation, Redmond, Washington). In yet another example, the system may be run on a mainframe environment and a UNIX® server environment (UNIX is a registered trademark of X/Open Company Limited located in Reading, Berkshire, United Kingdom). In a further example, the system may be run on an iOS® environment (iOS is a registered trademark of Cisco Systems, Inc. located in San Jose, CA). In yet a further example, the system may be run on a Mac OS® environment (Mac OS is a registered trademark of Apple Inc. located in Cupertino, CA). In still yet a further example, the system may be run on Android® OS (Android is a registered trademark of Google, Inc. of Mountain View, CA). In another example, the system may be run on Linux® OS (Linux is a registered trademark of Linus Torvalds of Boston, MA). The application may be flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Further, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Further, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor for detecting hazards, the sensor comprising:

at least one memory with instructions stored thereon; and at least one processor in communication with the at least one memory, wherein the instructions, when executed by the at least one processor, cause the at least one processor to:

generate sensor profile data associated with a location proximate to the sensor based upon sensor data generated by the sensor and a plurality of other sensors associated with the location and in communication with the sensor, the plurality of other sensors including an electric vehicle (EV) sensor for monitoring charging of an EV;

apply the sensor profile data to a sensor model profile associated with the location and stored in the at least one memory, wherein the sensor model profile includes a plurality of parameter levels for the location proximate to the sensor generated by a machine learning model;

identify a discrepancy between the sensor profile data and the sensor model profile;

determine a potential electrical hazard associated with charging of the EV at the location based upon the discrepancy between the sensor profile data and the sensor model profile; and generate an alert based upon the potential electrical hazard at the location.

2. The sensor of claim 1, wherein the plurality of other sensors are different from the sensor, and wherein the instructions further cause the at least one processor to:

receive additional sensor data from the plurality of other sensors; and generate the sensor profile data further based upon the additional sensor data.

3. The sensor of claim 1, wherein the instructions further cause the at least one processor to:

receive an input indicating that normal conditions are present at the location;

generate initial sensor profile data based upon the location;

input the initial sensor profile data to the machine learning model;

receive the sensor model profile as an output from the machine learning model; and store the sensor model profile in the at least one memory as being associated with the location.

4. The sensor of claim 1, wherein the instructions further cause the at least one processor to:

receive another input indicating that the sensor has been moved to a different location;

generate updated sensor profile data associated with the different location based upon updated sensor data generated by the sensor proximate to the different location;

input the updated sensor profile data to the machine learning model;

receive an updated sensor model profile as an output from the machine learning model, wherein the updated sensor model profile includes a plurality of updated parameter levels for the different location; and store the updated sensor model profile in the at least one memory as being associated with the different location.

5. The sensor of claim 4, wherein the instructions further cause the at least one processor to:

generate new updated sensor profile data associated with the different location proximate to the sensor based upon new updated sensor data generated by the sensor;

apply the new updated sensor profile data to the updated sensor model profile;

identify a new discrepancy between the new updated sensor profile data and the updated sensor model profile;

determine a potential hazard at the different location based upon the new discrepancy between the new updated sensor profile data and the updated sensor model profile; and generate a second alert, the second alert based upon the potential hazard at the different location.

6. The sensor of claim 1, wherein the instructions further cause the at least one processor to:

determine a severity level of the potential electrical hazard at the location; and determine the alert from a plurality of alert options based upon the severity level, wherein the plurality of alert options include an audible alert outputted by the sensor and an alert message transmitted by the sensor to a computer device associated with the location.

7. A sensor system for detecting hazards, the sensor system comprising:

at least one sensor;

at least one memory with instructions stored thereon; and at least one processor in communication with the at least one memory, wherein the instructions, when executed by the at least one processor, cause the at least one processor to:

generate sensor profile data associated with a location proximate to the at least one sensor based upon sensor data generated by the at least one sensor and a plurality of other sensors associated with the location and in communication with the at least one sensor, the plurality of other sensors including an electric vehicle (EV) sensor for monitoring charging of an EV;

apply the sensor profile data to a sensor model profile associated with the location and stored in the at least one memory, wherein the sensor model profile includes a plurality of parameter levels for the location of the at least one sensor generated by a machine learning model;

identify a discrepancy between the sensor profile data and the sensor model profile;

determine a potential electrical hazard associated with charging of the EV at the location based upon the discrepancy between the sensor profile data and the sensor model profile; and generate an alert based upon the potential electrical hazard at the location.

8. The sensor system of claim 7, wherein the plurality of other sensors are different from the at least one sensor, and wherein the instructions further cause the at least one processor to:

receive additional sensor data from the plurality of other sensors; and generate the sensor profile data further based upon the additional sensor data.

9. The sensor system of claim 7, wherein the instructions further cause the at least one processor to:

receive an input indicating that normal conditions are present at the location;

generate initial sensor profile data based upon the location;

input the initial sensor profile data to the machine learning model;

receive the sensor model profile as an output from the machine learning model; and store the sensor model profile in the at least one memory as being associated with the location.

10. The sensor system of claim 7, wherein the instructions further cause the at least one processor to:

receive another input indicating that the at least one sensor has been moved to a different location;

generate updated sensor profile data associated with the different location based upon updated sensor data generated by the at least one sensor at the different location;

input the updated sensor profile data to the machine learning model;

receive an updated sensor model profile as an output from the machine learning model, wherein the updated sensor model profile includes a plurality of updated parameter levels for the different location; and store the updated sensor model profile in the at least one memory as being associated with the different location.

11. The sensor system of claim 10, wherein the instructions further cause the at least one processor to:

generate new updated sensor profile data associated with the different location of the at least one sensor based upon new updated sensor data generated by the at least one sensor;

apply the new updated sensor profile data to the updated sensor model profile;

identify a new discrepancy between the new updated sensor profile data and the updated sensor model profile;

determine a potential hazard at the different location based upon the new discrepancy between the new updated sensor profile data and the updated sensor model profile; and generate a second alert, the second alert based upon the potential hazard at the different location.

12. The sensor system of claim 7, wherein the instructions further cause the at least one processor to:

determine a severity level of the potential electrical hazard at the location; and determine the alert from a plurality of alert options based upon the severity level, wherein the plurality of alert options include an audible alert outputted by the at least one sensor and an alert message transmitted by the at least one sensor to a computer device associated with the location.

13. A computer-implemented method for detecting hazards implemented by at least one processor in communication with at least one memory, the computer-implemented method comprising:

generating sensor profile data associated with a location proximate to a sensor based upon sensor data generated by the sensor and a plurality of other sensors associated with the location and in communication with the sensor, the plurality of other sensors including an electric vehicle (EV) sensor for monitoring charging of an EV;

applying the sensor profile data to a sensor model profile associated with the location and stored in the at least one memory, wherein the sensor model profile includes a plurality of parameter levels for the location proximate to the sensor generated by a machine learning model;

identifying a discrepancy between the sensor profile data and the sensor model profile;

determining a potential electrical hazard associated with charging of the EV at the location based upon the discrepancy between the sensor profile data and the sensor model profile; and generating an alert based upon the potential electrical hazard at the location.

14. The computer-implemented method of claim 13, wherein the plurality of other sensors are different from the sensor, and the computer-implemented method further comprising comprises:

receiving additional sensor data from the plurality of other sensors; and generating the sensor profile data further based upon the additional sensor data.

15. The computer-implemented method of claim 13, further comprising:

receiving an input indicating that normal conditions are present at the location;

generating initial sensor profile data based upon the location;

inputting the initial sensor profile data to the machine learning model;

receiving the sensor model profile as an output from the machine learning model; and storing the sensor model profile in the at least one memory as being associated with the location.

16. The computer-implemented method of claim 13, further comprising:

receiving another input indicating that the sensor has been moved to a different location;

generating updated sensor profile data associated with the different location based upon updated sensor data generated by the sensor proximate to the different location;

inputting the updated sensor profile data to the machine learning model;

receiving an updated sensor model profile as an output from the machine learning model, wherein the updated sensor model profile includes a plurality of updated parameter levels for the different location; and storing the updated sensor model profile in the at least one memory as being associated with the different location.

17. The computer-implemented method of claim 16, further comprising:

generating new updated sensor profile data associated with the different location proximate to the sensor based upon new updated sensor data generated by the sensor;

applying the new updated sensor profile data to the updated sensor model profile;

identifying a new discrepancy between the new updated sensor profile data and the updated sensor model profile;

determining a potential hazard at the different location based upon the new discrepancy between the new updated sensor profile data and the updated sensor model profile; and generating a second alert, the second alert based upon the potential hazard at the different location.

18. The computer-implemented method of claim 13, further comprising:

determining a severity level of the potential hazard at the location; and determining the alert from a plurality of alert options based upon the severity level, wherein the plurality of alert options include an audible alert outputted by the sensor and an alert message transmitted by the sensor to a computer device associated with the location.

* * * * *